(12) United States Patent
Huang et al.

(10) Patent No.: US 12,237,887 B2
(45) Date of Patent: *Feb. 25, 2025

(54) COMMUNICATION APPARATUS AND COMMUNICATION METHOD FOR CHANNEL ESTIMATION

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,742

(22) Filed: Dec. 19, 2023

(65) Prior Publication Data

US 2024/0162945 A1    May 16, 2024

Related U.S. Application Data

(63) Continuation of application No. 18/068,390, filed on Dec. 19, 2022, now Pat. No. 11,894,893, which is a (Continued)

(30) Foreign Application Priority Data

Oct. 1, 2018 (SG) .......................... 10201808652U

(51) Int. Cl.
*H04L 1/02* (2006.01)
*H04B 7/0417* (2017.01)
*H04B 7/0452* (2017.01)

(52) U.S. Cl.
CPC .......... *H04B 7/0452* (2013.01); *H04B 7/0417* (2013.01)

(58) Field of Classification Search
CPC ... H04L 1/0009; H04L 1/0643; H04L 1/0026; H04L 5/0037; H04L 5/0055;
(Continued)

(56) References Cited

U.S. PATENT DOCUMENTS 11,122,564 B2    9/2021    Noh et al.
11,218,196 B2    1/2022    Lou et al.
(Continued)

FOREIGN PATENT DOCUMENTS

CN    106533522 A    3/2017
JP    2018-521519 A    8/2018
(Continued)

OTHER PUBLICATIONS

Choi et al., "View on EHT Objectives and Technologies," doc.: IEEE 802.11-18/1171r0, Jul. 2018, 13 pages.
(Continued)

*Primary Examiner* — Khai Tran
(74) *Attorney, Agent, or Firm* — Seed IP Law Group LLP

(57) ABSTRACT

The present disclosure provides communication apparatus and communication method for channel estimation. The communication apparatus comprises a transmitter, which in operation, transmits a physical layer protocol data unit (PPDU) to one or more other communication apparatus in a multiple-input multiple-output (MIMO) wireless network, the PPDU including a long training field (LTF) that facilitates the one or more other communication apparatus to estimate respective channels for respective communications with the communication apparatus; and a controller, which in operation, establishes the number of LTF symbols ($N_{LTF}$) for generating the LTF in the PPDU, wherein the $N_{LTF}$
(Continued)

depends on a maximum value ($N_{STSMAX}$) of the number of space-time streams for each resource unit (RU) in the PPDU.

10 Claims, 18 Drawing Sheets

Related U.S. Application Data continuation of application No. 17/277,682, filed as application No. PCT/SG2019/050394 on Aug. 8, 2019, now Pat. No. 11,588,521.

(58) Field of Classification Search
CPC . H04L 27/2602; H04L 7/2627; H04L 7/0044; H04W 72/044; H04W 80/022; H04W 24/02; H04W 24/08; H04W 74/00; H04W 72/04; H04W 72/51; H04B 7/017; H04B 7/0413; H04B 7/0452; H04B 7/097
USPC .......................................... 375/267, 260, 262
See application file for complete search history.

(56) References Cited

U.S. PATENT DOCUMENTS

| | | |
|---|---|---|
| 2016/0007325 A1 | 1/2016 | Seok |
| 2016/0142227 A1 | 5/2016 | Li et al. |
| 2016/0174200 A1 | 6/2016 | Seok |
| 2016/0301451 A1 | 10/2016 | Seok |
| 2016/0323848 A1 | 11/2016 | Azizi et al. |
| 2018/0184408 A1 | 6/2018 | Xue et al. |
| 2020/0015234 A1 | 1/2020 | Li et al. |
| 2021/0153125 A1 | 5/2021 | Cariou |
| 2021/0288858 A1 | 9/2021 | Cao et al. |
| 2021/0337546 A1 | 10/2021 | Kim et al. |
| 2021/0359885 A1 | 11/2021 | Shellhammer et al. |
| 2022/0271986 A1* | 8/2022 | Hu .................. H04L 5/0053 |
| 2022/0322215 A1* | 10/2022 | Kim ................. H04L 5/003 |
| 2023/0123619 A1* | 4/2023 | Das .................. H04W 8/005 370/329 |
| 2024/0205903 A1* | 6/2024 | Yu ................... H04W 84/12 |

FOREIGN PATENT DOCUMENTS

| | | |
|---|---|---|
| WO | WO 2016209622 A1 | 12/2016 |
| WO | WO 2019042210 A1 | 3/2019 |

OTHER PUBLICATIONS

International Search Report, mailed Oct. 17, 2019, corresponding to International Application No. PCT/SG2019/050394, 4 pages.
Extended European Search Report, dated Oct. 18, 2021, for European Application No. 19868499.5-1216, 12 pages.
Sigurd Schelstraete, Quantenna, "Corrections to "Number of HE-LTF Symbols and Midamble Periodicity" subfield," IEEE 802.11-18/0483r2, IEEE P802.11 Wireless LANs, Mar. 5, 2018, 7 pages.
Zhang et al., "1 lax Comment Resolutions for Clause 28.3.10.10," Doc.: IEEE 802.11-17/0720r0, May 2017. (11 pages).
Zhang et al., "Proposed Changes for Clause 26 of 1 lax D0.5," doc.: IEEE 802.11-16/1410rl, Nov. 2016. (10 pages).

\* cited by examiner

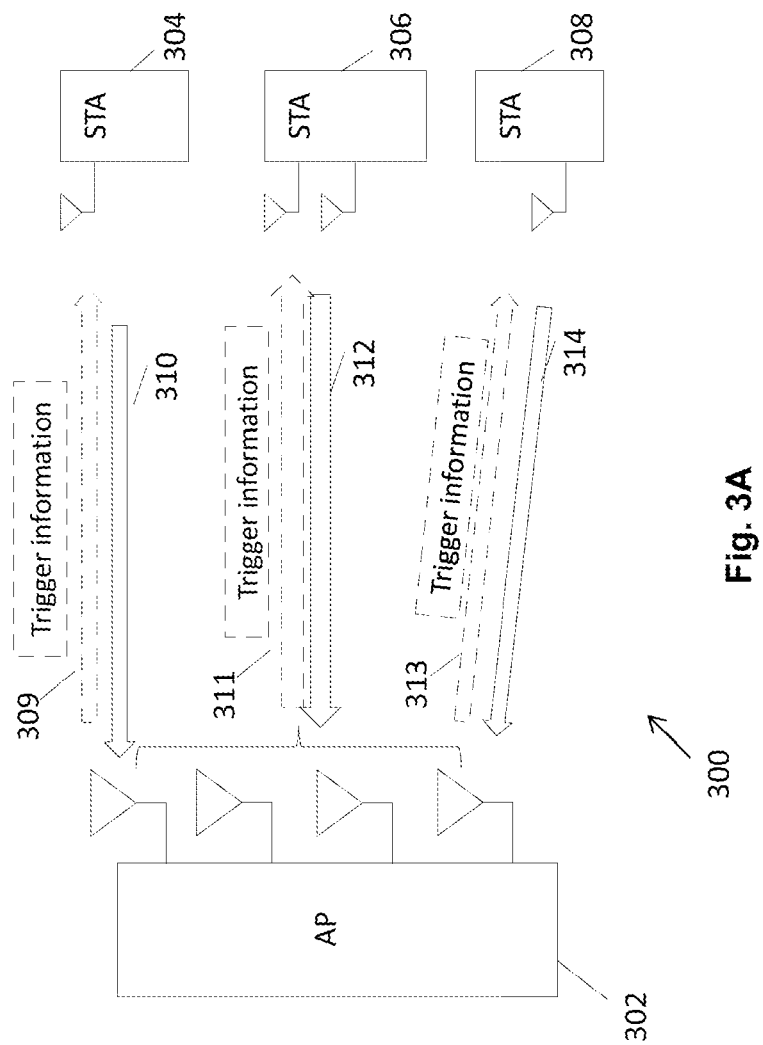

| $N_{STSMAX}$ | $N_{EHT-LTF}$ |
|---|---|
| 2 | 2 |
| 3 | 4 |
| 4 | 4 |
| 5 | 6 |
| 6 | 6 |
| 7 | 8 |
| 8 | 8 |

| $N_{STSMAX}$ | $N_{EHT-LTF}$ |
|---|---|
| 9 | 10 |
| 10 | 10 |
| 11 | 12 |
| 12 | 12 |
| 13 | 14 |
| 14 | 14 |
| 15 | 16 |
| 16 | 16 |

Fig. 5

Example: threshold = 5

| $N_{STSMAX}$ | $N_{EHT-LTF}$ |
|---|---|
| 2 | 2 |
| 3 | 4 |
| 4 | 4 |
| 5 | 5 |
| 6 | 6 |
| 7 | 7 |
| 8 | 8 |

| $N_{STSMAX}$ | $N_{EHT-LTF}$ |
|---|---|
| 9 | 9 |
| 10 | 10 |
| 11 | 11 |
| 12 | 12 |
| 13 | 13 |
| 14 | 14 |
| 15 | 15 |
| 16 | 16 |

Example: threshold = 7

| $N_{STSMAX}$ | $N_{EHT-LTF}$ |
|---|---|
| 2 | 2 |
| 3 | 4 |
| 4 | 4 |
| 5 | 6 |
| 6 | 6 |
| 7 | 7 |
| 8 | 8 |

| $N_{STSMAX}$ | $N_{EHT-LTF}$ |
|---|---|
| 9 | 9 |
| 10 | 10 |
| 11 | 11 |
| 12 | 12 |
| 13 | 13 |
| 14 | 14 |
| 15 | 15 |
| 16 | 16 |

COMMUNICATION APPARATUS AND COMMUNICATION METHOD FOR CHANNEL ESTIMATION

TECHNICAL FIELD

The present disclosure relates to communication apparatuses and methods for channel estimation, and more particularly to communication apparatuses and methods for channel estimation in multiple-input multiple-output (MIMO) wireless networks.

BACKGROUND

In the standardization of next generation wireless local area network (WLAN), a new radio access technology having backward compatibilities with IEEE 802.11a/b/g/n/ac/ax technologies has been discussed in the IEEE 802.11 Working Group, and is named Extremely High Throughput (EHT) WLAN.

In EHT WLAN, in order to provide significant peak throughput and capacity increase over 802.11ax high efficiency (HE) WLAN, it is desired to increase the maximum number of spatial streams from 8 to 16, especially for multiuser multiple-input multiple-output (MU-MIMO) transmissions.

However, there has been no discussion on communication apparatuses and methods for MIMO channel estimation in the context of EHT WLAN.

There is thus a need for communication apparatuses and methods that provide feasible technical solutions for MIMO channel estimation in the context of EHT WLAN. Furthermore, other desirable features and characteristics will become apparent from the subsequent detailed description and the appended claims, taken in conjunction with the accompanying drawings and this background of the disclosure.

SUMMARY

One non-limiting and exemplary embodiment facilitates providing apparatuses for MIMO channel estimation in context of EHT WLAN.

According to a first embodiment of the present disclosure, there is provided a communication apparatus comprising: a transmitter, which in operation, transmits a physical layer protocol data unit (PPDU) to one or more other communication apparatus in a multiple-input multiple-output (MIMO) wireless network, the PPDU including a long training field (LTF) that facilitates the one or more other communication apparatus to estimate respective channels for respective communications with the communication apparatus; and a controller, which in operation, establishes the number of LTF symbols ($N_{LTF}$) for generating the LTF in the PPDU, wherein the $N_{LTF}$ depends on a maximum value ($N_{STSMAX}$) of the number of space-time streams for each resource unit (RU) in the PPDU.

According to a second embodiment of the present disclosure, there is provided a communication method comprising: transmitting, from a first communication apparatus to one or more second communication apparatus in a multiple-input multiple-output (MIMO) wireless network, a physical layer protocol data unit (PPDU), the PPDU including a long training field (LTF) that facilitates the one or more second communication apparatus to estimate respective channels for respective communications with the first communication apparatus; and establishing, by the first communication apparatus, the number of LTF symbols ($N_{LTF}$) for generating the LTF in the PPDU, wherein the $N_{LTF}$ depends on a maximum value ($N_{STSMAX}$) of the number of space-time streams for each resource unit (RU) in the PPDU.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 3A depicts a schematic diagram of uplink multiuser MIMO communications between an AP and multiple STAs in a MIMO wireless network. This uplink multiuser MIMO communications may be interchangeably referred to as trigger based MIMO communications.

FIG. 3B shows a format of a physical layer protocol data unit (PPDU) used for trigger based MIMO communications as depicted in FIG. 3A.

FIG. 5 shows an example of $N_{LTF}$ determination in accordance with a first embodiment of the present disclosure.

FIGS. 6A and 6B show two examples of $N_{LTF}$ determination in accordance with a second embodiment of the present disclosure

Figure 1A:
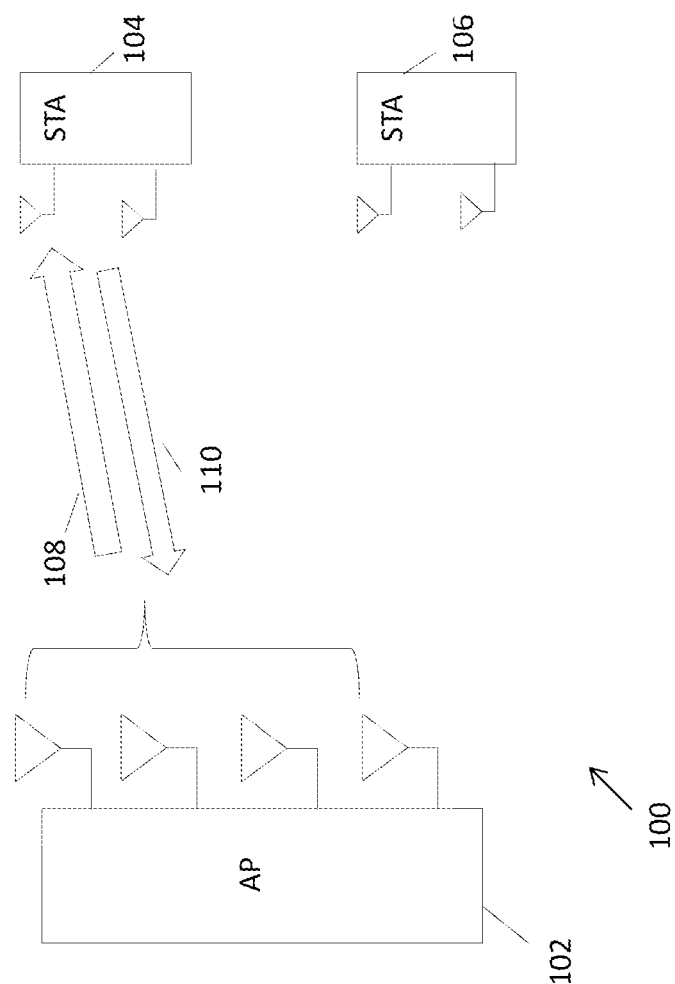
FIG. 1A depicts a schematic diagram of uplink and downlink single-user multiple input multiple output (MIMO) communications between an access point (AP) and a station (STA) in a MIMO wireless network.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for channel estimation, especially in a multiple-input multiple-output (MIMO) wireless network.

In the context of IEEE 802.11 (Wi-Fi) technologies, a station, which is interchangeably referred to as a STA, is a communication apparatus that has the capability to use the 802.11 protocol. Based on the IEEE 802.11-2007 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be an integral component of the router itself.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In a MIMO wireless network, "multiple" refers to multiple antennas used simultaneously for transmission and multiple antennas used simultaneously for reception, all over a radio channel. In this regard, "multiple-input" refers to multiple transmitter antennas, which input a radio signal into the channel, and "multiple-output" refers to multiple receiver antennas, which receives the radio signal from the channel and into the receiver. For example, in a N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, single-user communications and multiuser communications can be deployed for communications between communications apparatuses such as APs and STAs.

FIG. 1A depicts a schematic diagram of single-user MIMO communications 100 between an AP 102 and a STA 104 in a MIMO wireless network. As shown, the MIMO wireless network may include one or more STAs (e.g. STA 104, STA 106, etc). In the single-user MIMO communications 100, the AP 102 transmits multiple spatial streams using multiple antennas (e.g. 4 antennas as depicted in FIG. 1A) with all the spatial streams directed to a single communication apparatus, i.e. the STA 104. For the sake of simplicity, the multiple spatial streams directed to the STA 104 are illustrated as a grouped data transmission arrow 108 directed to the STA 104.

The single-user MIMO communications 100 can be configured for bi-directional transmissions. As shown in FIG. 1A, in the single-user MIMO communications 100, the STA 104 may transmit multiple spatial streams using multiple antennas (e.g. 2 antennas as depicted in FIG. 1A) with all the spatial streams directed to the AP 102. For the sake of simplicity, the multiple spatial streams directed to the AP 102 are illustrated as a grouped data transmission arrow 110 directed to the AP 102.

As such, the single-user MIMO communications 100 depicted in FIG. 1A enables both uplink single-user transmissions and downlink single-user transmissions in MIMO wireless network.

Figure 1B:
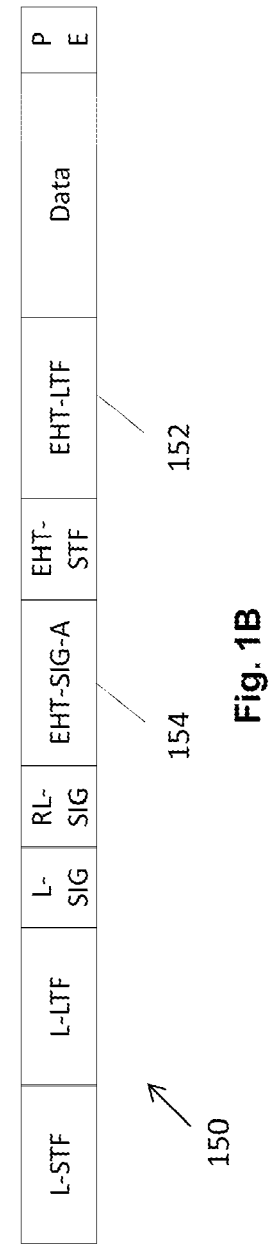
FIG. 1B shows a format of a physical layer protocol data unit (PPDU) used for single-user MIMO communications as depicted in FIG. 1A.

FIG. 1B shows a format of a physical layer protocol data unit (PPDU) 150 used for the single-user MIMO communications as depicted in FIG. 1A. Such a PPDU 150 is interchangeably referred to as a single-user PPDU and can be used for both downlink single-user transmissions and uplink single-user transmissions.

For example, if the MIMO wireless network is a next generation WLAN with an extremely high throughput, such as an EHT WLAN in which the maximum number of spatial streams is increased from 8 to 16, the single-user PPDU 150 as shown in FIG. 1B may include a non-High Throughput Short Training Field (L-STF), a non-High Throughput Long Training Field (L-LTF), a non-High Throughput Signal Field (L-SIG), a Repeated L-SIG (RL-SIG), an Extremely High Throughput Signal A (EHT-SIG-A) field 154, an Extremely High Throughput Short Training Field (EHT-STF), an Extremely High Throughput Long Training Field (EHT-LTF) 152, a Data field and a Packet Extension (PE) field. It is appreciable that if the IEEE 802.11 Working Group uses a new name instead of "EHT WLAN" for the next generation WLAN with an extremely high throughput, the prefix "EHT" in the above fields may change accordingly.

In a single-user PPDU as well as any other types of PPDUs, the EHT-LTF is used to provide information to a receiver (either of a STA in downlink transmissions or of an AP in uplink transmissions) to estimate a channel that a transmitter (either of an AP in downlink transmissions or of a STA in uplink transmissions) uses for communications. The Data field is variable in length, which carries user data payload.

In the single-user PPDU 100, the transmitter provides training for $N_{STS, total}$ space-time streams used for the transmission of Physical Layer Service Data Unit (PSDU) in a predetermined resource unit (RU) of the Data field, where $N_{STS, total}$ represents the number of space-time streams in the RU. For example, if the bandwidth of the single-user PPDU 100 is 20 MHz, the predetermined RU is a 242-tone RU. The different types of RU are defined in IEEE 802.11ax.

Figures 2A, 2B:
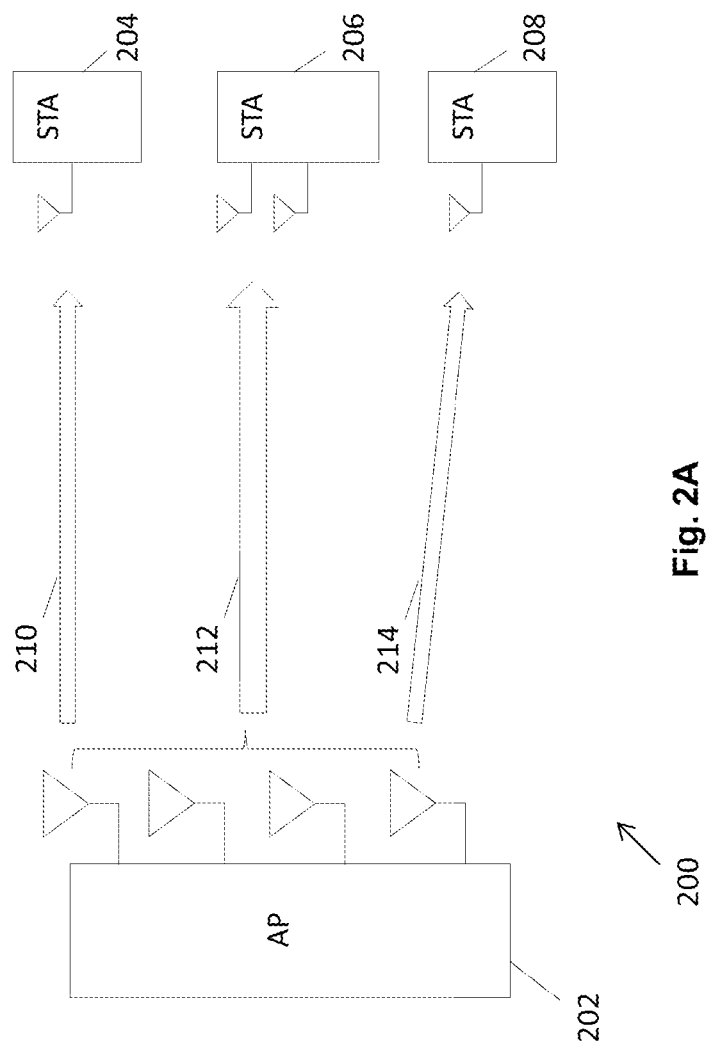
FIG. 2A depicts a schematic diagram of downlink multiuser MIMO communications between an AP and multiple STAs in a MIMO wireless network.
FIG. 2B shows a format of a physical layer protocol data unit (PPDU) used for downlink multiuser MIMO communications as depicted in FIG. 2A.

FIG. 2A depicts a schematic diagram of downlink multiuser MIMO communications 200 between an AP 202 and multiple STAs 204, 206, 208 in a MIMO wireless network.

The MIMO wireless network may include one or more STAs (e.g. STA 204, STA 206, STA 208, etc). In the downlink multiuser MIMO communications 200, the AP 202 transmits multiple streams simultaneously to the STAs 204, 206, 208 in the network using multiple antennas. For example, two spatial streams may be directed to the STA 206, another spatial stream may be directed to the STA 204, and yet another spatial stream may be directed to the STA 208. For the sake of simplicity, the two spatial streams directed to the STA 206 are illustrated as a grouped data transmission arrow 212, the spatial stream directed to the STA 204 is illustrated as a data transmission arrow 210, and the spatial stream directed to the STA 208 is illustrated as a data transmission arrow 214.

FIG. 2B shows a format of a PPDU 250 used for downlink multiuser MIMO communications between an AP and multiple STAs. Such a PPDU 250 is referred to as a multiuser PPDU 250.

As shown in FIG. 1B, if the MIMO wireless network is with an extremely high throughput, such as an EHT WLAN, the multiuser PPDU 250 may be referred to as EHT MU PPDU 250 and includes a L-STF, a L-LTF, a L-SIG, a RL-SIG, an EHT-SIG-A field 254, an Extremely High Throughput Signal B (EHT-SIG-B) field 256, an EHT-STF, an EHT-LTF 252, a Data field and a PE field. As compared to the single-user PPDU 150, the multiuser PPDU 250 includes an additional signal field (e.g. EHT-SIG-B 256) that signals user-specific resource allocation information (e.g. the number of space-time streams, a starting stream index and the allocated RU) for each of the multiple STAs/users communicating with the AP. It is appreciable that if the IEEE 802.11 Working Group uses a new name instead of "EHT WLAN" for the next generation WLAN with an extremely high throughput, the prefix "EHT" in the above fields may change accordingly.

As described above, the EHT-LTF in the multiuser PPDU 250 is used to provide information to a receiver (i.e. of a STA in the downlink multiuser MIMO communications) to estimate a channel that a transmitter (i.e. of an AP in the downlink multiuser MIMO communications) uses for communications. The Data field is variable in length, which carries user data payload.

In the multiuser PPDU 250, the transmitter provides training for $N_{STS,r,total}$ space-time streams used for the transmission of PSDUs in a r-th RU of the Data field, where $N_{STS,r,total}$ represents the number of space-time streams over all the STA(s)/user(s) in the r-th RU.

To enable uplink multiuser transmissions in multiuser MIMO communications, trigger based communications is provided to the MIMO wireless network. In this regard, FIG. 3A depicts a schematic diagram of uplink multiuser MIMO communications 300, i.e. trigger based communications 300, between an AP 202 and multiple STAs 304, 306, 308 in a MIMO wireless network.

Since there are multiple STAs 304, 306, 308 participating in the trigger based MIMO communications, in order to manage uplink transmissions in the trigger based MIMO communications, the AP 302 needs to coordinate simultaneous transmissions of multiple STAs 304, 306, 308.

To do so, as shown in FIG. 3A, the AP 302 transmits trigger information 309, 311, 313 simultaneously to the multiple STAs 304, 306, 308 to indicate user-specific resource allocation information (e.g. the number of space-time streams, a starting stream index and the allocated RU) each STA can use. The trigger information is included in a Trigger frame or in the MAC header of a Control Wrapper frame, a Quality of Service (QoS) Data frame or a Management frame. In response to the trigger information, the multiple STAs 304, 306, 308 may then arrange uplink transmissions 310, 312, 324 to the AP 302 according to the user-specific resource allocation information indicated in the trigger information.

FIG. 3B shows a format of a PPDU 350 used for trigger-based communications between an AP and multiple STAs. Such a PPDU is referred to as a trigger based PPDU 350.

In the trigger based PPDU 350, the transmitter of user u in a r-th RU provides training for $N_{STS,r,u}$ space-time streams used for a uplink transmission of PSDU in the r-th RU of the Data field, where $N_{STS,r,u}$ represents the number of space-time streams in the r-th RU for user u.

As shown in FIG. 3B, if the MIMO wireless network is with an extremely high throughput, such as an EHT WLAN, the trigger based PPDU 350 includes the same fields as those included in the single-user PPDU 150, except that the EHT-STF in the trigger based PPDU 350 may have a longer duration than that in the single-user PPDU 150.

It is understood that FIGS. 1A, 2A and 3A are depicted for illustrating mechanisms of single-user or multiuser MIMO communications as described above. For the sake of simplicity, certain components of the APs 102, 202, 302 and the STAs 104, 106, 204, 206, 208, 304, 306, 308, such as transmitters, receivers, etc., are not depicted.

In addition, for the sake of simplicity, each of the APs 102, 202, 302 in FIGS. 1A, 2A and 3A is depicted to include four antennas for data transmission. It is appreciable by those skilled in the art that the APs 102, 202, 302 may include more antennas to achieve high throughput. For example, if the MIMO wireless network is with an extremely high throughput, such as an EHT WLAN in which the maximum number of spatial streams is 16 as described above, each of the APs 102, 202, 302 may include 16 antennas for data transmission. The number of antennas that each of the STAs 104, 106, 204, 206, 208, 304, 306, 308 has may vary accordingly.

Embodiments of the present disclosure provide various technical solutions for channel estimation in the above described single-user or multiuser MIMO communications. More importantly and advantageously, the technical solutions of the present disclosure facilitate channel estimation in a MIMO wireless network of an extremely high throughput, such as an EHT WLAN in which the maximum number of spatial streams is increased from 8 to 16.

In order to support communications in the next generation WLAN (e.g. EHT WLAN) in which the maximum number of spatial streams is increased from 8 to 16, the EHT-LTF of the single-user PPDU 150, the multiuser PPDU 250 and the trigger based PPDU 350 needs to support up to 16 spatial streams.

However, the Long Training Field (LTF) of various types of PPDU in the existing technologies cannot support up to 16 spatial streams. For example, in the HE WLAN introduced in IEEE 802.11ax, the High Efficient Long Training Field (HE-LTF) of a HE PPDU can support only up to 8 spatial streams.

In order to support communications in the next generation WLAN (e.g. EHT WLAN) in which the maximum number of spatial streams is increased from 8 to 16, the present disclosure advantageously provides communication apparatuses and communication methods that are configured to construct/generate the EHT-LTF to support up to 16 spatial streams for channel estimation in the above described single-user or multiuser MIMO communications.

Figure 4:
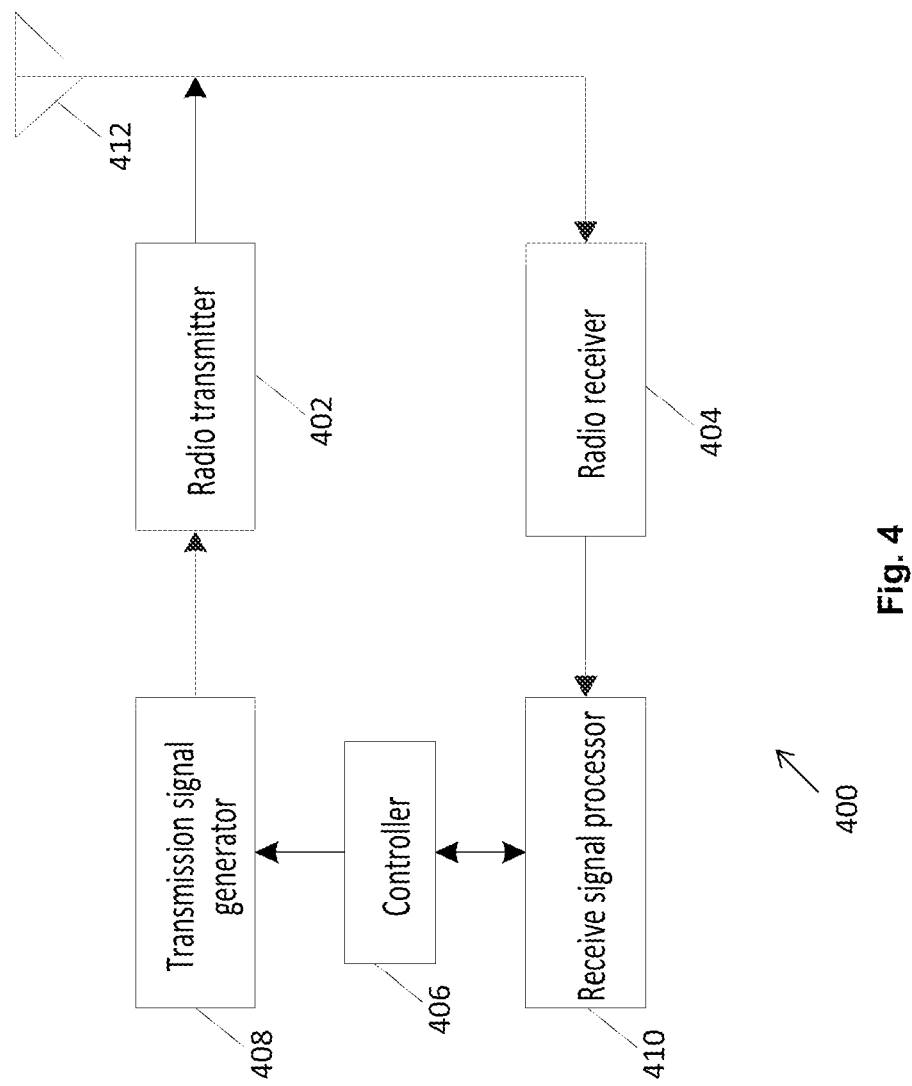
FIG. 4 shows a schematic example of communication apparatus in accordance with embodiments. The communication apparatus may be implemented as an AP or a STA and configured for channel estimation in accordance with various embodiments of the present disclosure.

FIG. 4 shows a schematic, partially sectioned view of a communication apparatus 400 in MIMO communications according to various embodiments of the present disclosure. The communication apparatus 400 may be implemented as an AP 102, 202, 302 or a STA 104, 106, 204, 206, 208, 304, 306, 308 according to various embodiments.

As shown in FIG. 4, the communication apparatus 400 is typically provided with at least one radio transmitter 402, at least one radio receiver 404, multiple antennas 412 (for the sake of simplicity, only one antenna is depicted in FIG. 4 for illustration purposes) and at least one controller 406 for use in software and hardware aided execution of tasks it is designed to perform, including control of communications with one or more other communication apparatuses in a MIMO wireless network. The at least one controller 406 may control at least one transmission signal generator 408 for generating PPDUs to be sent through the at least one radio transmitter 402 to one or more other communication apparatuses and at least one receive signal processor 410 for processing PPDUs received through the at least one radio receiver 404 from the one or more other communication apparatuses. The at least one transmission signal generator 408 and the at least one receive signal processor 410 may be stand-alone modules of the communication apparatus 400 that communicate with the at least one controller 406 for the above-mentioned functions, as shown in FIG. 4. Alternatively, the at least one transmission signal generator 408 and the at least one receive signal processor 410 may be included in the at least one controller 406. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 402, at least one radio receiver 404, and at least one antenna 412 may be controlled by the at least one controller 406.

In the embodiment shown in FIG. 4, the at least one radio receiver 404, together with the at least one receive signal processor 410, forms a receiver of the communication apparatus 400. The receiver of the communication apparatus 400, when in operation, provides functions required for channel estimation.

In some embodiments, the at least one radio transmitter 402, in operation, may transmit a PPDU to one or more other communication apparatus in a MIMO wireless network. The PPDU includes a LTF (i.e. EHT-LTF) that facilitates the one or more other communication apparatus to estimate respective channels for respective communications with the communication apparatus.

For example, in a downlink single-user MIMO communication, the communication apparatus 400 is an AP, the one or more other communication apparatus in the MIMO wireless network is a STA. In operation, the at least one radio transmitter 402 of the AP 400 transmits the PPDU in the format of a single-user PPDU to the receiver of the STA.

Likewise, in an uplink single-user MIMO communication, the communication apparatus 400 is a STA, the one or more other communication apparatus in the MIMO wireless network is an AP. In operation, the at least one radio transmitter 402 of the STA 400 transmits the PPDU in the format of a single-user PPDU to the receiver of the AP.

In a downlink multiuser MIMO communication, the communication apparatus 400 is an AP, the one or more other communication apparatus in the MIMO wireless network include multiple STAs. In operation, the at least one radio transmitter 402 of the AP 400 transmits the PPDU in the format of a multiuser PPDU to the receiver of each of the multiple STAs.

In a trigger based MIMO communication, the communication apparatus 400 is a STA, the one or more other communication apparatus in the MIMO wireless network is an AP. In operation, the at least one radio transmitter 402 of the STA 400 transmits the PPDU in the format of a trigger based PPDU to the receiver of the AP.

In the single-user PPDU, multiuser PPDU or trigger based PPDU, the LTF comprises a plurality of LTF symbols for the receiver of the one or more other communication apparatus to estimate respective channels for respective communications with the transmitter of the communication apparatus in single-user or multiuser communications.

In the present disclosure, the at least one controller 406 of the communication apparatus 400 establishes the number of LTF symbols ($N_{LTF}$) for generating the LTF in the PPDU.

In some examples, in downlink single-user MIMO communications and downlink multi-user MIMO communications, the at least one controller 406 of the AP 400 determines the $N_{LTF}$ when establishing the $N_{LTF}$ for generating a single-user PPDU or a multiuser PPDU. In uplink single-user MIMO communications, the at least one controller 406 of the STA 400 determines the $N_{LTF}$ when establishing the $N_{LTF}$ for generating a single-user PPDU.

In some other examples, in trigger based MIMO communications, the $N_{LTF}$ is determined by the at least one controller of the AP and included into trigger information as described above. When the STA 400 receives the trigger information from the AP, the at least one controller 406 of the STA 400 establishes the $N_{LTF}$ by retrieving the $N_{LTF}$ from the trigger information and generates a trigger-based PPDU.

In various embodiments of the present disclosure, the $N_{LTF}$ is dependent on a maximum value ($N_{STSMAX}$) of the number of space-time streams for each RU in the PPDU. That is, the $N_{STSMAX}$ is equal to the maximum of $N_{STS,r,total}$ for r=0, . . . , $N_r$–1 where $N_r$ is the number of RUs in the Data field of the PPDU. As described above, in order to support communications in the next generation WLAN in which the maximum number of spatial streams is increased from 8 to 16, the LTF of the single-user PPDU, the multiuser PPDU or the trigger based PPDU in the present disclosure supports up to 16 spatial streams. In this regard, $N_{STSMAX}$ in the PPDU may be greater than 8.

FIG. 5 shows an example of $N_{LTF}$ determination in accordance with a first embodiment of the present disclosure. In the example, the at least one controller 406 of the AP 400 (in downlink single-user MIMO communications, downlink multi-user MIMO communications and trigger-based MIMO communications) or the STA 400 (in uplink single-user MIMO communications) determines the $N_{LTF}$ to be equal to the $N_{STSMAX}$ in the PPDU when the $N_{STSMAX}$ is an even number; and determines the $N_{LTF}$ to be equal to 1 plus $N_{STSMAX}$ in the PPDU when the $N_{STSMAX}$ is an odd number other than 1.

As shown in $N_{LTF}$ determination table 500 of FIG. 5, when the $N_{STSMAX}$ in the PPDU is an even number such as 2, 4, 6, 8, 10, 12, 14 or 16, the $N_{LTF}$ is determined to be equal to the $N_{STSMAX}$ 2, 4, 6, 8, 10, 12, 14 or 16. When the $N_{STSMAX}$ in the PPDU is an odd number other than 1, such as 3, 5, 7, 9, 11, 13 or 15, the $N_{LTF}$ is determined to be equal to 1 plus the $N_{STSMAX}$. That is, 2, 4, 6, 8, 10, 12, 14 or 16.

In this example, when the MIMO communications is a downlink single-user MIMO communication, the at least one controller 406 of the AP 400 indicates $N_{STSMAX}$ (i.e. $N_{STS,total}$) in the SIG-A (i.e. EHT-SIG-A) field when generating the PPDU in the format of a single-user PPDU. In this manner, a receiver of the STA can derive $N_{LTF}$ from $N_{STSMAX}$ after decoding the SIG-A field, for estimating a channel usable for communications with the AP 400.

When the MIMO communications is an uplink single-user MIMO communication, the at least one controller 406 of the STA 400 indicates $N_{STSMAX}$ (i.e. $N_{STS,total}$) in the SIG-A field when generating the PPDU in the format of a single-user PPDU. In this manner, a receiver of the AP can derive $N_{LTF}$ from $N_{STSMAX}$ after decoding the SIG-A field, for estimating a channel usable for communications with the STA 400.

When the MIMO communications is a downlink multiuser MIMO communication, the at least one controller 406 of the AP 400 indicates $N_{LTF}$ in the SIG-A field and user-specific resource allocation information for each user in the SIG-B (i.e. EHT-SIG-B) field when generating the PPDU in the format of a multiuser PPDU. The user-specific resource allocation information includes the number of space-time streams, a starting stream index and the allocated RU. In this manner, a receiver of the STA can retrieve $N_{LTF}$ directly from the SIG-A field and derive its own user-specific resource allocation information from the SIG-B field, for estimating a channel usable for communications with the AP 400.

When the MIMO communications is a trigger based MIMO communication, the $N_{LTF}$ and user-specific resource allocation information (e.g. the number of space-time streams, a starting stream index and the allocated RU) for each user are determined by the AP and informed in trigger information to each of the STA 400 engaged in the trigger based MIMO communication. The trigger information, when received by each of the STA 400, triggers the trigger based MIMO communication. In this scenario, the PPDU in the format of a trigger based PPDU generated by the at least one transmission signal generator 408 of the STA 400 does not include $N_{LTF}$ and user-specific resource allocation information in the SIG-A field, since the $N_{LTF}$ and user-specific resource allocation information are already known by the AP, as the AP is the one who initially determines the $N_{LTF}$ and user-specific resource allocation information.

To enable MIMO channel estimation at the receiver of the STA (in downlink single-user MIMO communications and downlink multi-user MIMO communications) or the AP (in uplink single-user MIMO communications and trigger-based MIMO communications), every space-time stream is spread over data tones of all the LTF symbols by one row of a $P_{LTF}$ matrix as defined below. Different space-time streams use different rows in the $P_{LTF}$ matrix. How the LTF symbols in a single-user PPDU, a multiuser PPDU or a trigger-based PPDU are generated according to the $P_{LTF}$ matrix is detailed in IEEE 802.12ax.

$$P_{LTF} = \begin{cases} P_{4\times4}, N_{LTF} \leq 4 \\ P_{6\times6}, N_{LTF} = 6 \\ P_{8\times8}, N_{LTF} = 8 \\ P_{10\times10}, N_{LTF} = 10 \\ P_{12\times12}, N_{LTF} = 12 \\ P_{14\times14}, N_{LTF} = 14 \\ P_{16\times16}, N_{LTF} = 16 \end{cases} \quad (1)$$

wherein $P_{4\times4}$, $P_{6\times6}$, $P_{8\times8}$ can be the same as those defined in IEEE 802.11 ac; and $P_{10\times10}$, $P_{12\times12}$, $P_{14\times14}$ and $P_{16\times16}$ are defined in the present disclosure as follows:

$$P_{10\times10} = \begin{bmatrix} 1 & -1 & 1 & 1 & 1 & 1 & 1 & 1 & 1 & -1 \\ 1 & -w^1 & w^2 & w^3 & w^4 & w^5 & w^6 & w^7 & w^8 & -w^9 \\ 1 & -w^2 & w^4 & w^6 & w^8 & w^{10} & w^{12} & w^{14} & w^{16} & -w^{18} \\ 1 & -w^3 & w^6 & w^9 & w^{12} & w^{15} & w^{18} & w^{21} & w^{24} & -w^{27} \\ 1 & -w^4 & w^8 & w^{12} & w^{16} & w^{20} & w^{24} & w^{28} & w^{32} & -w^{36} \\ 1 & -w^5 & w^{10} & w^{15} & w^{20} & w^{25} & w^{30} & w^{35} & w^{40} & -w^{45} \\ 1 & -w^6 & w^{12} & w^{18} & w^{24} & w^{30} & w^{36} & w^{42} & w^{48} & -w^{54} \\ 1 & -w^7 & w^{14} & w^{21} & w^{28} & w^{35} & w^{42} & w^{49} & w^{56} & -w^{63} \\ 1 & -w^8 & w^{16} & w^{24} & w^{32} & w^{40} & w^{48} & w^{56} & w^{64} & -w^{72} \\ 1 & -w^9 & w^{18} & w^{27} & w^{36} & w^{45} & w^{54} & w^{63} & w^{72} & -w^{81} \end{bmatrix}$$

where w=exp(−j2π/10);

$$P_{12 \times 12} = \begin{bmatrix} P_{6 \times 6} & P_{6 \times 6} \\ P_{6 \times 6} & -P_{6 \times 6} \end{bmatrix}; \text{ and}$$

$$P_{14 \times 14} = \begin{bmatrix}
1 & -1 & 1 & 1 & 1 & 1 & 1 & 1 & 1 & 1 & 1 & 1 & 1 & -1 \\
1 & -w^1 & w^2 & w^3 & w^4 & w^5 & w^6 & w^7 & w^8 & w^9 & w^{10} & w^{11} & w^{12} & -w^{13} \\
1 & -w^2 & w^4 & w^6 & w^8 & w^{10} & w^{12} & w^{14} & w^{16} & w^{18} & w^{20} & w^{22} & w^{24} & -w^{26} \\
1 & -w^3 & w^6 & w^9 & w^{12} & w^{15} & w^{18} & w^{21} & w^{24} & w^{27} & w^{30} & w^{33} & w^{36} & -w^{39} \\
1 & -w^4 & w^8 & w^{12} & w^{16} & w^{20} & w^{24} & w^{28} & w^{32} & w^{36} & w^{40} & w^{44} & w^{48} & -w^{52} \\
1 & -w^5 & w^{10} & w^{15} & w^{20} & w^{25} & w^{30} & w^{35} & w^{40} & w^{45} & w^{50} & w^{55} & w^{60} & -w^{65} \\
1 & -w^6 & w^{12} & w^{18} & w^{24} & w^{30} & w^{36} & w^{42} & w^{48} & w^{54} & w^{60} & w^{66} & w^{72} & -w^{78} \\
1 & -w^7 & w^{14} & w^{21} & w^{28} & w^{35} & w^{42} & w^{49} & w^{56} & w^{63} & w^{70} & w^{77} & w^{84} & -w^{91} \\
1 & -w^8 & w^{16} & w^{24} & w^{32} & w^{40} & w^{48} & w^{56} & w^{64} & w^{72} & w^{80} & w^{88} & w^{96} & -w^{104} \\
1 & -w^9 & w^{18} & w^{27} & w^{36} & w^{45} & w^{54} & w^{63} & w^{72} & w^{81} & w^{90} & w^{99} & w^{108} & -w^{117} \\
1 & -w^{10} & w^{20} & w^{30} & w^{40} & w^{50} & w^{60} & w^{70} & w^{80} & w^{90} & w^{100} & w^{110} & w^{120} & -w^{130} \\
1 & -w^{11} & w^{22} & w^{33} & w^{44} & w^{55} & w^{66} & w^{77} & w^{88} & w^{99} & w^{110} & w^{121} & w^{132} & -w^{143} \\
1 & -w^{12} & w^{24} & w^{36} & w^{48} & w^{60} & w^{72} & w^{84} & w^{96} & w^{108} & w^{120} & w^{132} & w^{144} & -w^{156} \\
1 & -w^{13} & w^{26} & w^{39} & w^{52} & w^{65} & w^{78} & w^{91} & w^{104} & w^{117} & w^{130} & w^{143} & w^{156} & -w^{169}
\end{bmatrix}$$

where w=exp(−j2π/14); and $$P_{16 \times 16} = \begin{bmatrix} P_{8 \times 8} & P_{8 \times 8} \\ P_{8 \times 8} & -P_{8 \times 8} \end{bmatrix}.$$

FIGS. 6A and 6B show two examples of $N_{LTF}$ determination in accordance with a second embodiment of the present disclosure. In this embodiment, the at least one controller 406 of the AP 400 (in downlink single-user MIMO communications, downlink multi-user MIMO communications and trigger-based MIMO communications) or the STA 400 (in uplink single-user MIMO communications) determines the $N_{LTF}$ to be equal to 1 plus the $N_{STSMAX}$ in the PPDU when the $N_{STSMAX}$ is an odd number smaller than a threshold; and determines the $N_{LTF}$ to be equal to the $N_{STSMAX}$ in the PPDU when the $N_{STSMAX}$ is an odd number equal to or larger than the threshold. In addition, when the $N_{STSMAX}$ in the PPDU is an even number, the at least one controller 406 of the AP 400 (in downlink single-user MIMO communications, downlink multi-user MIMO communications and trigger-based MIMO communications) or the STA 400 (in uplink single-user MIMO communications) determines the $N_{LTF}$ to be equal to the $N_{STSMAX}$.

For example, as shown in $N_{LTF}$ determination table 600 of FIG. 6A, the threshold may be set as 5. In this example, when the $N_{STSMAX}$ in the PPDU is an odd number smaller than the threshold 5, such as 3, the $N_{LTF}$ is determined to be equal to 1 plus the $N_{STSMAX}$. That is, 4. When the $N_{STSMAX}$ is an odd number equal to or larger than the threshold 5, such as 5, 7, 9, 11, 13, or 15, the $N_{LTF}$ is determined to be equal to the $N_{STSMAX}$ 5, 7, 9, 11, 13, or 15. In addition, when the $N_{STSMAX}$ in the PPDU is an even number such as 2, 4, 6, 8, 10, 12, 14 or 16, the $N_{LTF}$ is determines to be equal to the $N_{STSMAX}^2$, 4, 6, 8, 10, 12, 14 or 16.

For another example, as shown in $N_{LTF}$ determination 650 of FIG. 6B, the threshold may be set as 7. In this example, when the $N_{STSMAX}$ in the PPDU is an odd number smaller than the threshold 7, such as 3 or 5, the $N_{LTF}$ is determined to be equal to 1 plus the $N_{STSMAX}$. That is, 4 or 6. When the $N_{STSMAX}$ is an odd number equal to or larger than the threshold 7, such as 7, 9, 11, 13, or 15, the $N_{LTF}$ is determined to be equal to the $N_{STSMAX}$ 7, 9, 11, 13, or 15. In addition, when the $N_{STSMAX}$ in the PPDU is an even number such as 2, 4, 6, 8, 10, 12, 14 or 16, the $N_{LTF}$ is determined to be equal to the $N_{STSMAX}^2$, 4, 6, 8, 10, 12, 14 or 16.

In the embodiments shown in FIGS. 6A and 6B, to enable MIMO channel estimation at the receiver of the STA (in downlink single-user MIMO communications and downlink multi-user MIMO communications) or the AP (in uplink single-user MIMO communications and trigger-based MIMO communications), every space-time stream is spread over data tones of all the LTF symbols by one row of the $P_{LTF}$ matrixes as defined below. Different space-time streams use different rows in the $P_{LTF}$ matrixes. How the LTF symbols in a single-user PPDU, a multiuser PPDU or a trigger-based PPDU are generated according to the $P_{LTF}$ matrix is detailed in IEEE 802.11ax.

$$P_{LTF} = \begin{cases} P_{4 \times 4}, N_{LTF} \leq 4 \\ P_{5 \times 5}, N_{LTF} = 5 \\ P_{6 \times 6}, N_{LTF} = 6 \\ P_{7 \times 7}, N_{LTF} = 7 \\ P_{8 \times 8}, N_{LTF} = 8 \\ P_{9 \times 9}, N_{LTF} = 9 \\ P_{10 \times 10}, N_{LTF} = 10, \\ P_{11 \times 11}, N_{LTF} = 11 \\ P_{12 \times 12}, N_{LTF} = 12 \\ P_{13 \times 13}, N_{LTF} = 13 \\ P_{14 \times 14}, N_{LTF} = 14 \\ P_{15 \times 15}, N_{LTF} = 15 \\ P_{16 \times 16}, N_{LTF} = 16 \end{cases} \quad (2)$$

when the threshold is 5; and $$P_{LTF} = \begin{cases} P_{4\times4}, & N_{LTF} \leq 4 \\ P_{6\times6}, & N_{LTF} = 6 \\ P_{7\times7}, & N_{LTF} = 7 \\ P_{8\times8}, & N_{LTF} = 8 \\ P_{9\times9}, & N_{LTF} = 9 \\ P_{10\times10}, & N_{LTF} = 10 \\ P_{11\times11}, & N_{LTF} = 11 \\ P_{12\times12}, & N_{LTF} = 12 \\ P_{13\times13}, & N_{LTF} = 13 \\ P_{14\times14}, & N_{LTF} = 14 \\ P_{15\times15}, & N_{LTF} = 15 \\ P_{16\times16}, & N_{LTF} = 16 \end{cases} \quad (3)$$

when the threshold is 7.

In equations (2) and (3), $P_{4\times4}$, $P_{6\times6}$, $P_{8\times8}$, $P_{12\times12}$ and $P_{16\times16}$ are the same as described above; and $P_{5\times5}$, $P_{7\times7}$, $P_{9\times9}$, $P_{10\times10}$, $P_{11\times11}$, $P_{13\times13}$, $P_{14\times14}$ and $P_{15\times15}$ are defined in the present disclosure, as follows.

$$P_{5\times5} = \begin{bmatrix} 1 & -1 & 1 & 1 & -1 \\ 1 & -w^1 & w^2 & w^3 & -w^4 \\ 1 & -w^2 & w^4 & w^6 & -w^8 \\ 1 & -w^3 & w^6 & w^9 & -w^{12} \\ 1 & -w^4 & w^8 & w^{12} & -w^{16} \end{bmatrix}$$

where $w = \exp(-j2\pi/5)$;

$$P_{7\times7} = \begin{bmatrix} 1 & -1 & 1 & 1 & 1 & 1 & -1 \\ 1 & -w^1 & w^2 & w^3 & w^4 & w^5 & -w^6 \\ 1 & -w^2 & w^4 & w^6 & w^8 & w^{10} & -w^{12} \\ 1 & -w^3 & w^6 & w^9 & w^{12} & w^{15} & -w^{18} \\ 1 & -w^4 & w^8 & w^{12} & w^{16} & w^{20} & -w^{24} \\ 1 & -w^5 & w^{10} & w^{15} & w^{20} & w^{25} & -w^{30} \\ 1 & -w^6 & w^{12} & w^{18} & w^{24} & w^{30} & -w^{36} \end{bmatrix}$$

where $w = \exp(-j2\pi/)$;

$$P_{9\times9} = \begin{bmatrix} 1 & -1 & 1 & 1 & 1 & 1 & 1 & 1 & -1 \\ 1 & -w^1 & w^2 & w^3 & w^4 & w^5 & w^6 & w^7 & -w^8 \\ 1 & -w^2 & w^4 & w^6 & w^8 & w^{10} & w^{12} & w^{14} & -w^{16} \\ 1 & -w^3 & w^6 & w^9 & w^{12} & w^{15} & w^{18} & w^{21} & -w^{24} \\ 1 & -w^4 & w^8 & w^{12} & w^{16} & w^{20} & w^{24} & w^{28} & -w^{32} \\ 1 & -w^5 & w^{10} & w^{15} & w^{20} & w^{25} & w^{30} & w^{35} & -w^{40} \\ 1 & -w^6 & w^{12} & w^{18} & w^{24} & w^{30} & w^{36} & w^{42} & -w^{48} \\ 1 & -w^7 & w^{14} & w^{21} & w^{28} & w^{35} & w^{42} & w^{49} & -w^{56} \\ 1 & -w^8 & w^{16} & w^{24} & w^{32} & w^{40} & w^{48} & w^{56} & -w^{64} \end{bmatrix}$$

where $w = \exp(-j2\pi/9)$;

$$P_{10\times10} = \begin{bmatrix} P_{5\times5} & P_{5\times5} \\ P_{5\times5} & -P_{5\times5} \end{bmatrix};$$

$$P_{11\times11} = \begin{bmatrix} 1 & -1 & 1 & 1 & 1 & 1 & 1 & 1 & 1 & 1 & -1 \\ 1 & -w^1 & w^2 & w^3 & w^4 & w^5 & w^6 & w^7 & w^8 & w^9 & -w^{10} \\ 1 & -w^2 & w^4 & w^6 & w^8 & w^{10} & w^{12} & w^{14} & w^{16} & w^{18} & -w^{20} \\ 1 & -w^3 & w^6 & w^9 & w^{12} & w^{15} & w^{18} & w^{21} & w^{24} & w^{27} & -w^{30} \\ 1 & -w^4 & w^8 & w^{12} & w^{16} & w^{20} & w^{24} & w^{28} & w^{32} & w^{36} & -w^{40} \\ 1 & -w^5 & w^{10} & w^{15} & w^{20} & w^{25} & w^{30} & w^{35} & w^{40} & w^{45} & -w^{50} \\ 1 & -w^6 & w^{12} & w^{18} & w^{24} & w^{30} & w^{36} & w^{42} & w^{48} & w^{54} & -w^{60} \\ 1 & -w^7 & w^{14} & w^{21} & w^{28} & w^{35} & w^{42} & w^{49} & w^{56} & w^{63} & -w^{70} \\ 1 & -w^8 & w^{16} & w^{24} & w^{32} & w^{40} & w^{48} & w^{56} & w^{64} & w^{72} & -w^{80} \\ 1 & -w^9 & w^{18} & w^{27} & w^{36} & w^{45} & w^{54} & w^{63} & w^{72} & w^{81} & -w^{90} \\ 1 & -w^{10} & w^{20} & w^{30} & w^{40} & w^{50} & w^{60} & w^{70} & w^{80} & w^{90} & -w^{100} \end{bmatrix}$$

where $w = \exp(-j2\pi/11)$; and $$P_{13\times13} = \begin{bmatrix} 1 & -1 & 1 & 1 & 1 & 1 & 1 & 1 & 1 & 1 & 1 & 1 & -1 \\ 1 & -w^1 & w^2 & w^3 & w^4 & w^5 & w^6 & w^7 & w^8 & w^9 & w^{10} & w^{11} & -w^{12} \\ 1 & -w^2 & w^4 & w^6 & w^8 & w^{10} & w^{12} & w^{14} & w^{16} & w^{18} & w^{20} & w^{22} & -w^{24} \\ 1 & -w^3 & w^6 & w^9 & w^{12} & w^{15} & w^{18} & w^{21} & w^{24} & w^{27} & w^{30} & w^{33} & -w^{36} \\ 1 & -w^4 & w^8 & w^{12} & w^{16} & w^{20} & w^{24} & w^{28} & w^{32} & w^{36} & w^{40} & w^{44} & -w^{48} \\ 1 & -w^5 & w^{10} & w^{15} & w^{20} & w^{25} & w^{30} & w^{35} & w^{40} & w^{45} & w^{50} & w^{55} & -w^{60} \\ 1 & -w^6 & w^{12} & w^{18} & w^{24} & w^{30} & w^{36} & w^{42} & w^{48} & w^{54} & w^{60} & w^{66} & -w^{72} \\ 1 & -w^7 & w^{14} & w^{21} & w^{28} & w^{35} & w^{42} & w^{49} & w^{56} & w^{63} & w^{70} & w^{77} & -w^{84} \\ 1 & -w^8 & w^{16} & w^{24} & w^{32} & w^{40} & w^{48} & w^{56} & w^{64} & w^{72} & w^{80} & w^{88} & -w^{96} \\ 1 & -w^9 & w^{18} & w^{27} & w^{36} & w^{45} & w^{54} & w^{63} & w^{72} & w^{81} & w^{90} & w^{99} & -w^{108} \\ 1 & -w^{10} & w^{20} & w^{30} & w^{40} & w^{50} & w^{60} & w^{70} & w^{80} & w^{90} & w^{100} & w^{110} & -w^{120} \\ 1 & -w^{11} & w^{22} & w^{33} & w^{44} & w^{55} & w^{66} & w^{77} & w^{88} & w^{99} & w^{110} & w^{121} & -w^{132} \\ 1 & -w^{12} & w^{24} & w^{36} & w^{48} & w^{60} & w^{72} & w^{84} & w^{96} & w^{108} & w^{120} & w^{132} & -w^{144} \end{bmatrix}$$

where w=exp(−j2π/13);

$$P_{14 \times 14} = \begin{bmatrix} P_{7\times 7} & P_{7\times 7} \\ P_{7\times 7} & -P_{7\times 7} \end{bmatrix}; \text{ and}$$

$$P_{15 \times 15} = \begin{bmatrix} 1 & -1 & 1 & 1 & 1 & 1 & 1 & 1 & 1 & 1 & 1 & 1 & 1 & 1 & -1 \\ 1 & -w^1 & w^2 & w^3 & w^4 & w^5 & w^6 & w^7 & w^8 & w^9 & w^{10} & w^{11} & w^{12} & w^{13} & -w^{14} \\ 1 & -w^2 & w^4 & w^6 & w^8 & w^{10} & w^{12} & w^{14} & w^{16} & w^{18} & w^{20} & w^{22} & w^{24} & w^{26} & -w^{28} \\ 1 & -w^3 & w^6 & w^9 & w^{12} & w^{15} & w^{18} & w^{21} & w^{24} & w^{27} & w^{30} & w^{33} & w^{36} & w^{39} & -w^{42} \\ 1 & -w^4 & w^8 & w^{12} & w^{16} & w^{20} & w^{24} & w^{28} & w^{32} & w^{36} & w^{40} & w^{44} & w^{48} & w^{52} & -w^{56} \\ 1 & -w^5 & w^{10} & w^{15} & w^{20} & w^{25} & w^{30} & w^{35} & w^{40} & w^{45} & w^{50} & w^{55} & w^{60} & w^{65} & -w^{70} \\ 1 & -w^6 & w^{12} & w^{18} & w^{24} & w^{30} & w^{36} & w^{42} & w^{48} & w^{54} & w^{60} & w^{66} & w^{72} & w^{78} & -w^{84} \\ 1 & -w^7 & w^{14} & w^{21} & w^{28} & w^{35} & w^{42} & w^{49} & w^{56} & w^{63} & w^{70} & w^{77} & w^{84} & w^{91} & -w^{98} \\ 1 & -w^8 & w^{16} & w^{24} & w^{32} & w^{40} & w^{48} & w^{56} & w^{64} & w^{72} & w^{80} & w^{88} & w^{96} & w^{104} & -w^{112} \\ 1 & -w^9 & w^{18} & w^{27} & w^{36} & w^{45} & w^{54} & w^{63} & w^{72} & w^{81} & w^{90} & w^{99} & w^{108} & w^{117} & -w^{126} \\ 1 & -w^{10} & w^{20} & w^{30} & w^{40} & w^{50} & w^{60} & w^{70} & w^{80} & w^{90} & w^{100} & w^{110} & w^{120} & w^{130} & -w^{140} \\ 1 & -w^{11} & w^{22} & w^{33} & w^{44} & w^{55} & w^{66} & w^{77} & w^{88} & w^{99} & w^{110} & w^{121} & w^{132} & w^{143} & -w^{154} \\ 1 & -w^{12} & w^{24} & w^{36} & w^{48} & w^{60} & w^{72} & w^{84} & w^{96} & w^{108} & w^{120} & w^{132} & w^{144} & w^{156} & -w^{168} \\ 1 & -w^{13} & w^{26} & w^{39} & w^{52} & w^{65} & w^{78} & w^{91} & w^{104} & w^{117} & w^{130} & w^{143} & w^{156} & w^{169} & -w^{182} \\ 1 & -w^{14} & w^{28} & w^{42} & w^{56} & w^{70} & w^{84} & w^{98} & w^{112} & w^{126} & w^{140} & w^{154} & w^{168} & w^{182} & -w^{196} \end{bmatrix}$$

where w=exp(−j2π/15).

In the above embodiment, the threshold may be predetermined and stored in both the AP and the STA in uplink and downlink single-user MIMO communications, downlink multi-user MIMO communications and trigger based MIMO communications for determining or deriving the $N_{LTF}$.

Alternatively, the threshold may be configurable by the AP. If the threshold is configurable, it may be indicated by the AP in an information element which carries BSS (Basic Service Set) operating parameters and can be included in Beacon frames, Probe Response frames, Association Response frames or Reassociation Response frames. In this case, the threshold retrieved from the most recently received information element is stored in the STA in uplink single-user MIMO communications and downlink single-user MIMO communications for determining or deriving the $N_{LTF}$.

Notice that the channel quality should be good enough to support larger $N_{STSMAX}$, thus a smaller number of LTF symbols may not reduce channel estimation accuracy when a larger $N_{STSMAX}$ is used in the Data field. In this manner, with the second embodiment of the present disclosure, the physical layer (PHY) throughput can be advantageously improved when a larger $N_{STS}$ is used in the data transmission.

In view of the first and second embodiments shown in FIGS. 5, 6A and 6B, a correspondence between the $N_{STSMAX}$ and the $N_{LTF}$ can be indicated by the $N_{LTF}$ determination tables predetermined and stored in both the AP and the STA in uplink and downlink single-user MIMO communications, downlink multi-user MIMO communications and trigger-based MIMO communications for determining or deriving the $N_{LTF}$.

Alternatively, in a third embodiment of $N_{LTF}$ determination in accordance with the present disclosure, the correspondence between the $N_{STSMAX}$ and the $N_{LTF}$ may not be predetermined. It may be configurable on a case by case basis when the at least one controller 406 of the AP 400 (in downlink single-user MIMO communications, downlink multi-user MIMO communications and trigger-based MIMO communications) or the STA 400 (in uplink single-user MIMO communications) determines the $N_{LTF}$ for each PPDU.

In the third embodiment, if the duration of the Data Field of a PPDU is relatively short (e.g., due to higher MCS and/or larger $N_{STSMAX}$), from the perspective of PHY throughput, reduction of LTF overhead becomes more significant than improvement of channel estimation accuracy. Therefore, $N_{LTF}$ may be equal to $N_{STSMAX}$. Notice that the channel quality should be good enough to support higher MCS and/or larger $N_{STSMAX}$. In such a case, a smaller number of LTF symbols may not reduce channel estimation accuracy when a higher MCS and/or a larger $N_{STSMAX}$ is used in the Data field.

On the other hand, if the duration of the Data Field of a PPDU is relatively long (e.g., due to lower MCS and/or smaller $N_{STSMAX}$), from the perspective of PHY throughput, the reduction of LTF overhead becomes less significant than improvement of channel estimation accuracy. Therefore, $N_{LTF}$ may be larger than $N_{STSMAX}$.

In the third embodiment, the at least one controller 406 of the AP 400 in downlink single-user MIMO communication or the STA 400 in uplink single-user MIMO communication indicates both $N_{STSMAX}$ (i.e. $N_{STS,total}$) and a correspondence between the $N_{STSMAX}$ and the $N_{LTF}$ in the SIG-A field when generating the PPDU in the format of a single-user PPDU. For example, in the SIG-A field, 1-bit signaling can be used to indicate whether $N_{LTF}$ is equal to $N_{STSMAX}$ or $N_{STSMAX}+1$. Likewise, 2-bit signaling can be used to indicate whether $N_{LTF}$ is equal to $N_{STSMAX}$, $N_{STSMAX}+1$, $N_{STSMAX}+2$ or $N_{STSMAX}+3$.

In the third embodiment, when the MIMO communications is a downlink multiuser MIMO communication or a trigger based MIMO communication, the signaling requirements are the same as those required in the embodiment shown in FIG. 5.

It is appreciable by those skilled in the art that the third embodiment advantageously further improves the PHY throughput.

In the third embodiment, to enable MIMO channel estimation at the receiver of the STA (in downlink single-user MIMO communications and downlink multi-user MIMO communications) or the AP (in uplink single-user MIMO communications and trigger-based MIMO communications), every space-time stream is spread over data tones of all the LTF symbols by one row of the $P_{LTF}$ matrix (2) as defined above. Different space-time streams use different rows in the $P_{LTF}$ matrix. How the LTF symbols in a single-user PPDU, a multiuser PPDU or a trigger-based PPDU are generated according to the $P_{LTF}$ matrix is detailed in IEEE 802.11 ax.

The third embodiment may be used in combination with the first embodiment or the second embodiment. For one example, the at least one controller 406 of the AP 400 in downlink single-user MIMO communication or the STA 400 in uplink single-user MIMO communication at first determines an initial value of $N_{LTF}$ (i.e. $N_{LTF,ini}$) based on $N_{STSMAX}$ according to the first embodiment as shown in FIG. 5 or the second embodiment as shown in FIG. 6A and FIG. 6B. Then the at least one controller 406 of the AP 400 in downlink single-user MIMO communication or of the STA 400 in uplink single-user MIMO communication indicates both $N_{STSMAX}$ (i.e. $N_{STS,total}$) and a correspondence between the $N_{LTF,ini}$ and the $N_{LTF}$ in the SIG-A field when generating the PPDU in the format of a single-user PPDU. For example, in the SIG-A field, 1-bit signaling can be used to indicate whether $N_{LTF}$ is equal to $N_{LTF,ini}$ or $N_{LTF,ini}+1$. Likewise, 2-bit signaling can be used to indicate whether $N_{LTF}$ is equal to $N_{LTF,ini}$, $N_{LTF,ini}+1$, $N_{LTF,ini}+2$ or $N_{LTF,ini}+3$.

For another example, the at least one controller 406 of the AP 400 in downlink single-user MIMO communication or the STA 400 in uplink single-user MIMO communication indicates both $N_{STSMAX}$ (i.e. $N_{STS,total}$) and a threshold in the SIG-A field when generating the PPDU in the format of a single-user PPDU. For example, in the SIG-A field, 1-bit signaling can be used to indicate whether the threshold is 3 or 5. Then the $N_{LTF}$ can be derived from the $N_{STSMAX}$ and the threshold in the SIG-A field according to the $N_{LTF}$ determination table as shown in FIG. 6A or FIG. 6B.

Figure 7:
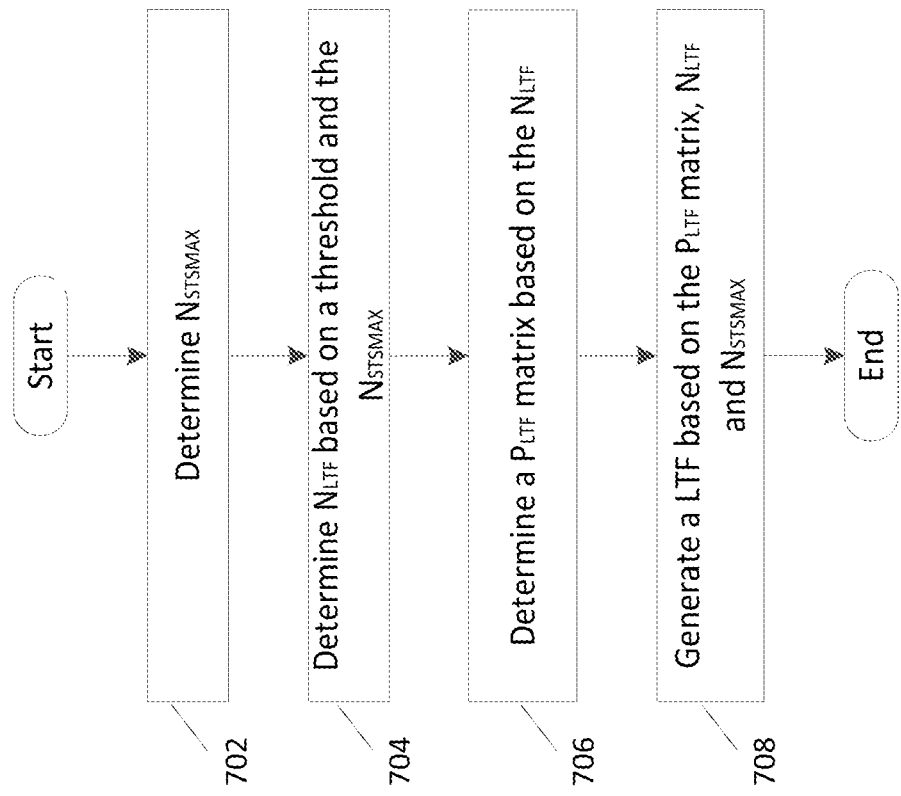
FIG. 7 shows an exemplary flow diagram of LTF generation in a PPDU at a communication apparatus in uplink and downlink single-user MIMO communications and downlink multiuser MIMO communications, in accordance with the second embodiment as depicted in FIGS. 6A and 6B. In downlink single-user MIMO communications and downlink multiuser MIMO communications, the communication apparatus is an AP. In uplink single-user MIMO communications, the communication apparatus is a STA.

FIG. 7 shows an exemplary flow diagram of LTF generation in a PPDU at a communication apparatus in accordance with the second embodiment as depicted in FIGS. 6A and 6B. This flow diagram is suitable to facilitate channel estimation in uplink and downlink single-user MIMO communications and downlink multiuser MIMO communications. In downlink single-user MIMO communications and downlink multiuser MIMO communications, the communication apparatus is an AP. In uplink single-user MIMO communications, the communication apparatus is a STA.

At step 702, the communication apparatus determines $N_{STSMAX}$ in a PPDU. The PPDU can be a single-user PPDU in uplink and downlink single-user MIMO communications or a multiuser PPDU in downlink multiuser MIMO communications.

At step 704, the communication apparatus establishes $N_{LTF}$ by determining $N_{LTF}$ based on a threshold and the $N_{STSMAX}$. Details of the determination of the $N_{LTF}$ have been described with respect to FIGS. 6A and 6B.

At step 706, the communication apparatus determines a $P_{LTF}$ matrix based on the $N_{LTF}$. The $P_{LTF}$ matrix may be selected from the predetermined $P_{LTF}$ matrices based on the $N_{LTF}$. Based on the $P_{LTF}$ matrix, $N_{LTF}$ and $N_{STSMAX}$, the communication apparatus generates a LTF at step 708. The generated LTF, along with other fields in the PPDU, will then be transmitted by a radio transmitter of the communication apparatus.

It is understandable that the above steps 702, 704, 706 and 708 may be performed by a same component or different components of the communication apparatus. For example, the above steps 702, 704, 706 and 708 may be performed by a controller of the communication apparatus, a transmission signal processor of the communication apparatus or any other component of the communication apparatus which is deemed suitable in practice.

Figure 8:
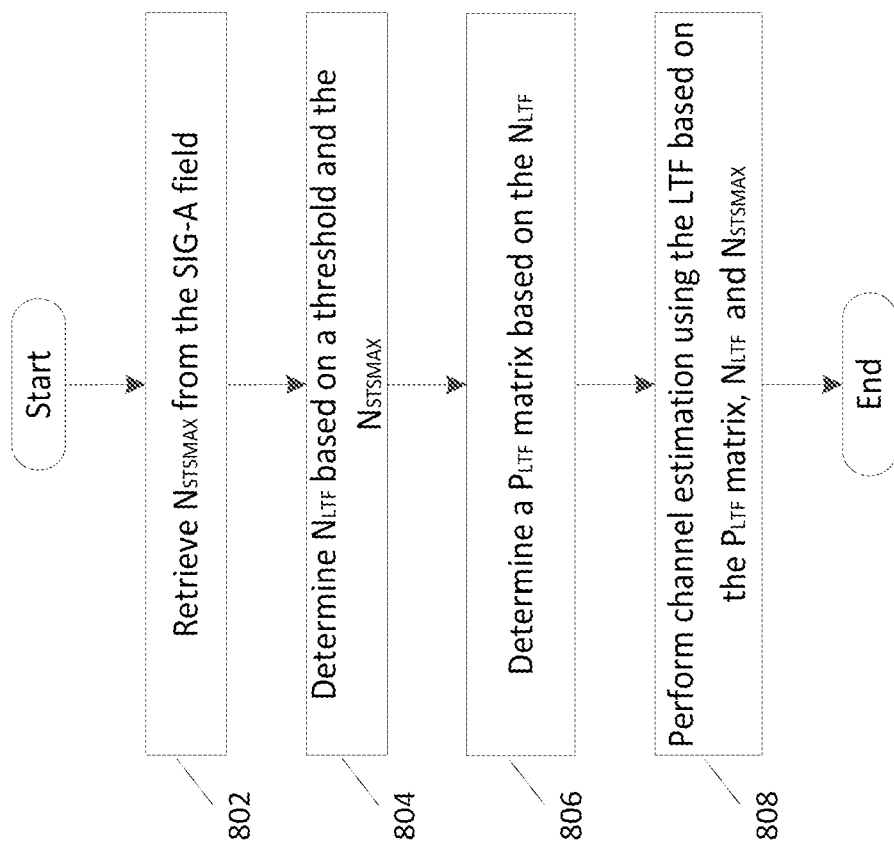
FIG. 8 shows a flow diagram of channel estimation at a communication apparatus in uplink and downlink single-user MIMO communications, in accordance with the second embodiment as depicted in FIGS. 6A and 6B. In downlink single-user MIMO communications, the communication apparatus is a STA. In uplink single-user MIMO communications, the communication apparatus is an AP.

FIG. 8 shows a flow diagram of channel estimation at a communication apparatus in downlink or uplink single-user MIMO communications, in accordance with the second embodiment as depicted in FIGS. 6A and 6B. In downlink single-user MIMO communications, the communication apparatus is a STA. In uplink single-user MIMO communications, the communication apparatus is an AP.

At step 802, the communication apparatus retrieves $N_{STSMAX}$ (i.e. $N_{STS,total}$) from a signalling information field in a received PPDU. The received PPDU can be a single-user PPDU. As described above, the signalling information field can be the SIG-A field of the single-user PPDU.

At step 804, the communication apparatus determines $N_{LTF}$ based on a threshold and the $N_{STSMAX}$. Details of the determination of the $N_{LTF}$ have been described with respect to FIGS. 6A and 6B.

At step 806, the communication apparatus determines a $P_{LTF}$ matrix based on the $N_{LTF}$. The $P_{LTF}$ matrix may be selected from the predetermined $P_{LTF}$ matrices based on the $N_{LTF}$. Based on the $P_{LTF}$ matrix, $N_{LTF}$ and $N_{STSMAX}$, the communication apparatus performs channel estimation using the LTF of the received PPDU at step 808 for the single-user MIMO communications.

It is understandable that the above steps 802, 804, 806 and 808 may be performed by a same component or different components of the communication apparatus. For example, the above steps 802, 804, 806 and 808 may be performed by a controller of the communication apparatus, a receiver of the communication apparatus or any other component of the communication apparatus which is deemed suitable in practice.

Figure 9:
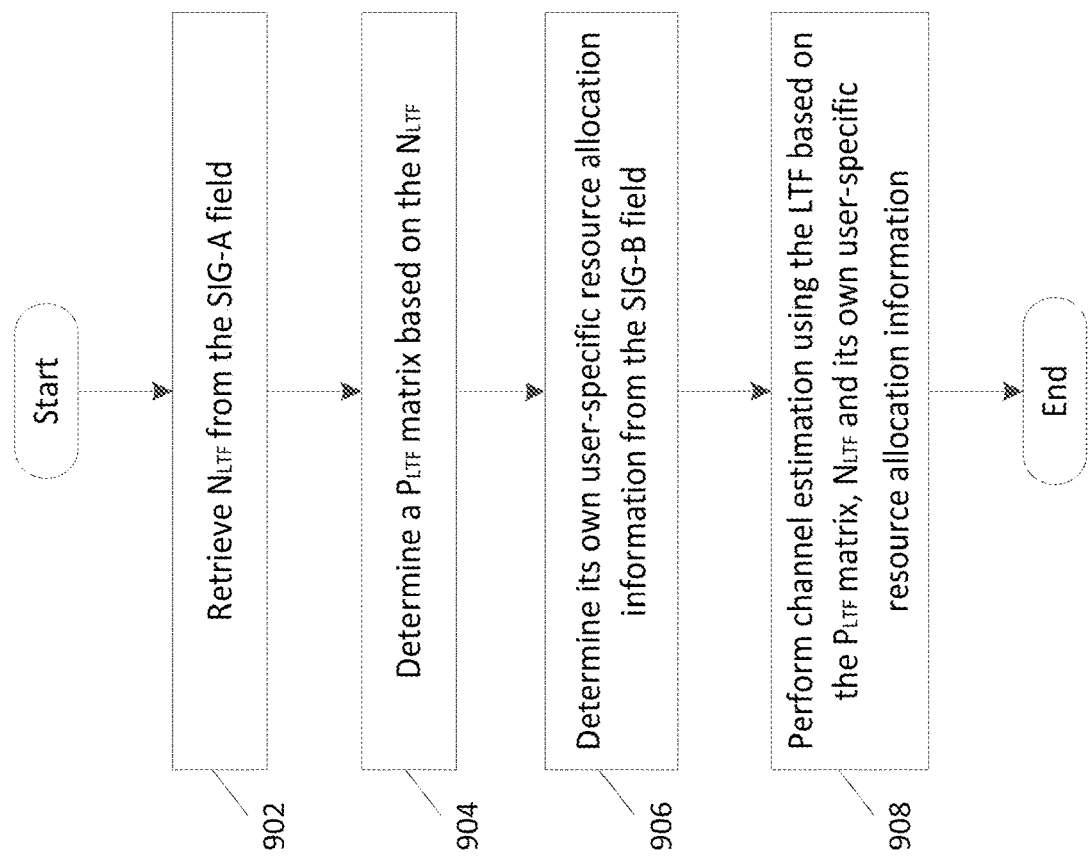
FIG. 9 shows a flow diagram of channel estimation at a STA in downlink multiuser MIMO communications, in accordance with the second embodiment as depicted in FIGS. 6A and 6B.

FIG. 9 shows a flow diagram of channel estimation at a STA in downlink multiuser MIMO communications, in accordance with the second embodiment as depicted in FIGS. 6A and 6B.

At step 902, the STA retrieves the $N_{LTF}$ from a signalling information field in a PPDU received from the AP. The PPDU can be a multiuser PPDU. As described above, the signalling information field can be the SIG-A field of the multiuser PPDU.

At step 904, the STA determines a $P_{LTF}$ matrix based on the $N_{LTF}$ for subsequent channel estimation. The $P_{LTF}$ matrix may be selected from the predetermined $P_{LTF}$ matrices based on the $N_{LTF}$.

At step 906, the STA determines its own user-specific resource allocation information from another signalling information field in the multiuser PPDU. The another signalling information field can be the SIG-B field of the multiuser PPDU. The user-specific resource allocation information includes the number of space-time streams, a starting stream index and the allocated RU.

Based on the $P_{LTF}$ matrix, the $N_{LTF}$ and its own user-specific resource allocation information, the STA performs channel estimation using the LTF of the received PPDU at step 908.

It is understandable that the above steps 902, 904, 906 and 908 may be performed by a same component or different components of the STA. For example, the above steps 902, 904, 906 and 908 may be performed by a controller of the STA, a receiver of the STA or any other component of the STA which is deemed suitable in practice.

Figure 10:
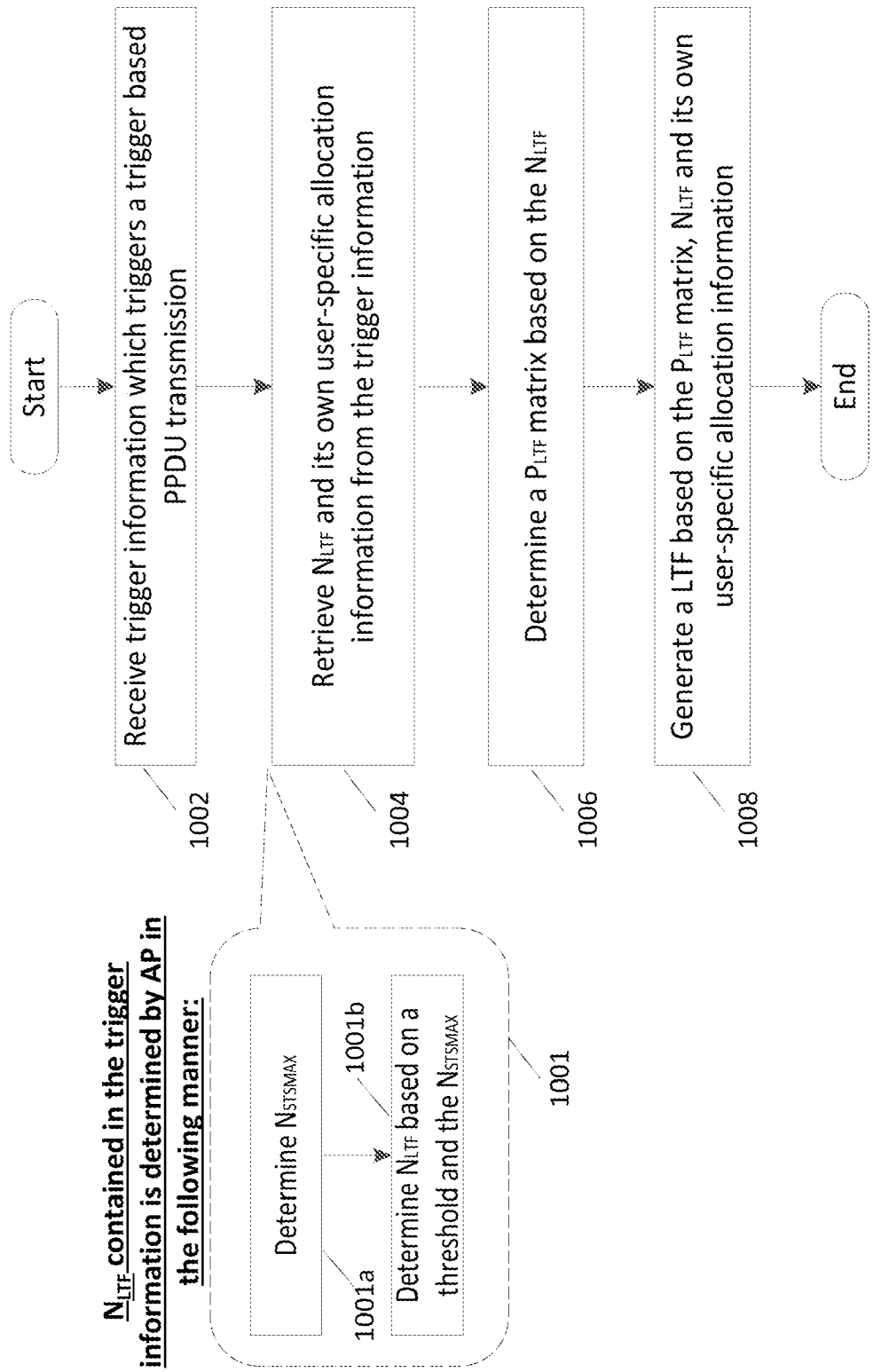
FIG. 10 shows a flow diagram of LTF generation in a PPDU at a STA in trigger based MIMO communications, in accordance with the second embodiment as depicted in FIGS. 6A and 6B.

FIG. 10 shows a flow diagram of LTF generation in a PPDU at a STA in accordance with the second embodiment as depicted in FIGS. 6A and 6B. This flow diagram is suitable to facilitate channel estimation in trigger based MIMO communications.

At step 1002, the STA receives trigger information from an AP. The trigger information triggers a trigger based MIMO communication.

At step 1004, the STA establishes $N_{LTF}$ by retrieving the $N_{LTF}$ from the trigger information. The STA also retrieves its own user-specific resource allocation information from the trigger information.

As shown in FIG. 10, the $N_{LTF}$ in the trigger information is determined by the AP in step 1001. Step 1001 includes two sub-steps 1001a and 1001b:

a. In step 1001a, the AP determines $N_{STSMAX}$ in the PPDU.
b. In step 1001b, the AP establishes the $N_{LTF}$ by determining the $N_{LTF}$ based on a threshold and the $N_{STSMAX}$.

At step 1006, the STA determines a $P_{LTF}$ matrix based on the $N_{LTF}$ for subsequent trigger based PPDU generation. The $P_{LTF}$ matrix may be selected from the predetermined $P_{LTF}$ matrices based on the $N_{LTF}$.

At step 1008, the STA generates a LTF based on the $P_{LTF}$ matrix, $N_{LTF}$ and its own user-specific resource allocation information.

The generated LTF, along with other fields in the PPDU, will then be transmitted by a radio transmitter of the STA to the AP for channel estimation in trigger based MIMO communications.

It is understandable that the above steps 1002, 1004, 1006 and 1008 may be performed by a same component or different components of the STA. For example, the above steps 1002, 1004, 1006 and 1008 may be performed by a controller of the STA, a transmission signal generator of the STA or any other component of the STA which is deemed suitable in practice.

Figure 11:
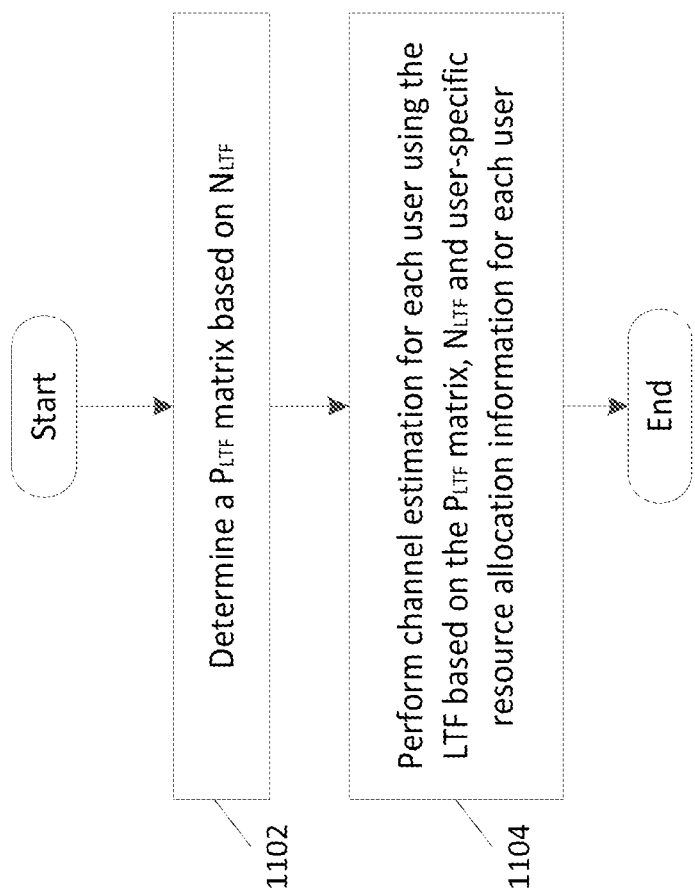
FIG. 11 shows a flow diagram of channel estimation at an AP in trigger based MIMO communications, in accordance with the second embodiment as depicted in FIGS. 6A and 6B.

FIG. 11 shows a flow diagram of channel estimation at an AP in trigger based MIMO communications, in accordance with the second embodiment as depicted in FIGS. 6A and 6B.

At step 1102, the AP determines a $P_{LTF}$ matrix based on the $N_{LTF}$ that was determined in step 1001b. The $P_{LTF}$ matrix may be selected from the predetermined $P_{LTF}$ matrices based on the $N_{LTF}$.

At step 1104, the AP performs channel estimation for each user/STA in the trigger-based MIMO communication using the LTF of a received PPDU based on the $P_{LTF}$ matrix and user-specific resource allocation information for each user. The received PPDU can be a trigger-based PPDU. The user-specific resource allocation information includes the allocated RU, the number of space-time streams and a starting stream index.

It is understandable that the above steps 1102 and 1104 may be performed by a same component or different components of the AP. For example, the above steps 1102 and 1104 may be performed by a controller of the AP, a receiver of the AP or any other component of the AP which is deemed suitable in practice.

Figure 12:
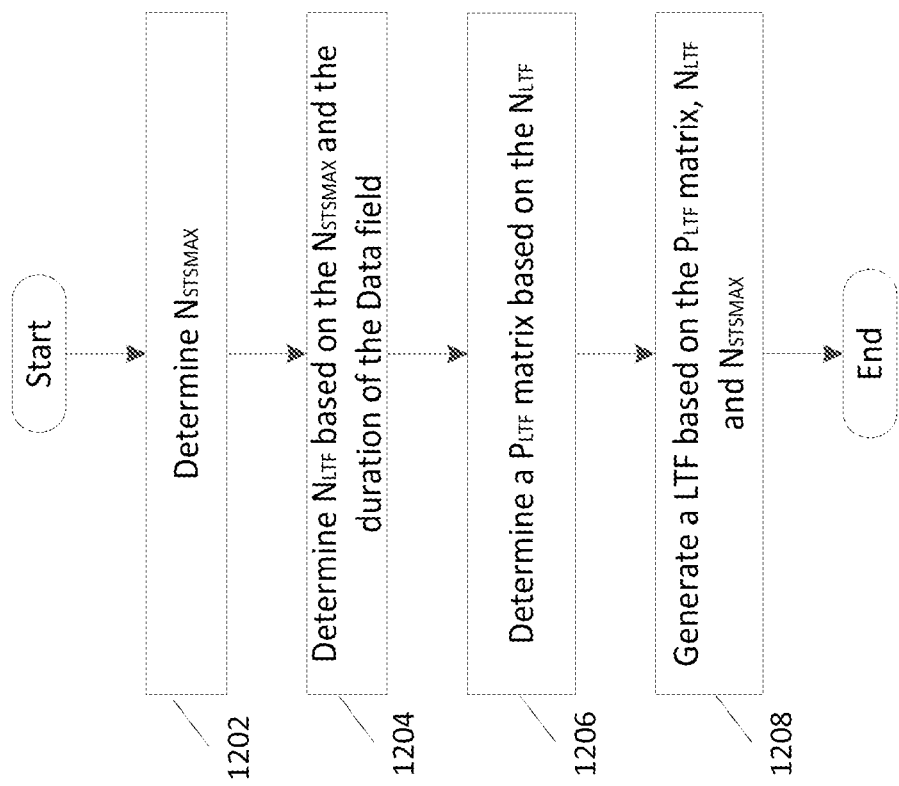
FIG. 12 shows a flow diagram of LTF generation in a PPDU at a communication apparatus in uplink and downlink single-user MIMO communications and downlink multiuser MIMO communications, in accordance with a third embodiment (not shown). In downlink single-user MIMO communications and downlink multiuser MIMO communications, the communication apparatus is an AP. In uplink single-user MIMO communications, the communication apparatus is a STA.

FIG. 12 shows a flow diagram of LTF generation in a PPDU at a communication apparatus in accordance with the third embodiment as described above (not shown). This flow diagram is suitable to facilitate channel estimation in uplink and downlink single-user MIMO communications and downlink multiuser MIMO communications. In downlink single-user MIMO communications and downlink multiuser MIMO communications, the communication apparatus is an AP. In uplink single-user MIMO communications, the communication apparatus is an STA.

At step 1202, the communication apparatus determines $N_{STSMAX}$ in a PPDU. The PPDU can be a single-user PPDU in uplink and downlink single-user MIMO communications or a multiuser PPDU in downlink multiuser MIMO communications.

At step 1204, the communication apparatus establishes $N_{LTF}$ by determining the $N_{LTF}$ based on the $N_{STSMAX}$ and the duration of the Data field in the PPDU. Details of the determination of the $N_{LTF}$ have been described with respect to the third embodiment of the present disclosure.

At step 1206, the communication apparatus determines a $P_{LTF}$ matrix based on the $N_{LTF}$. The $P_{LTF}$ matrix may be selected from the predetermined $P_{LTF}$ matrices based on the $N_{LTF}$.

Based on the $P_{LTF}$ matrix, $N_{LTF}$ and $N_{STSMAX}$, the communication apparatus generates a LTF at step 1208. The generated LTF, along with other fields in the PPDU, will then be transmitted by a radio transmitter of the communication apparatus.

It is understandable that the above steps 1202, 1204, 1206 and 1208 may be performed by a same component or different components of the communication apparatus. For example, the above steps 1202, 1204, 1206 and 1208 may be performed by a controller of the communication apparatus, a transmission signal generator of the communication apparatus or any other component of the communication apparatus which is deemed suitable in practice.

Figure 13:
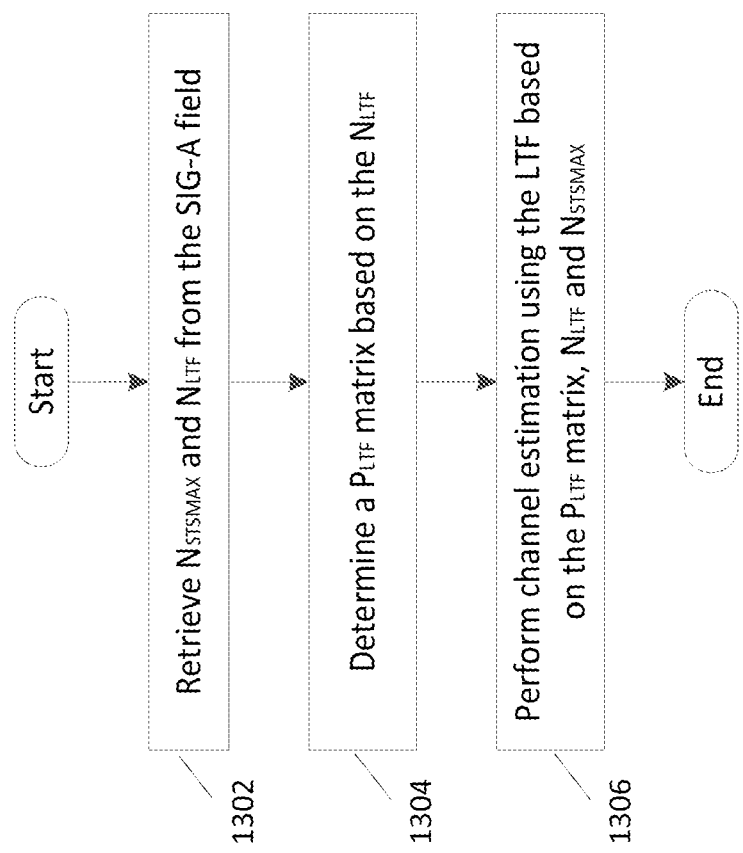
FIG. 13 shows a flow diagram of channel estimation at a communication apparatus in uplink and downlink single-user MIMO communications, in accordance with the third embodiment. In downlink single-user MIMO communications, the communication apparatus is a STA. In uplink single-user MIMO communications, the communication apparatus is an AP.

FIG. 13 shows a flow diagram of channel estimation at a communication apparatus in uplink and downlink single-user MIMO communications, in accordance with the third embodiment as described above. In downlink single-user MIMO communications, the communication apparatus is a STA. In uplink single-user MIMO communications, the communication apparatus is an AP.

At step 1302, the communication apparatus retrieves $N_{STSMAX}$ and $N_{LTF}$ from a signalling information field in a received PPDU. The received PPDU can be a single-user PPDU. As described above, the signalling information field can be the SIG-A field of the single-user PPDU.

At step 1304, the communication apparatus determines a $P_{LTF}$ matrix based on the $N_{LTF}$. The $P_{LTF}$ matrix may be selected from the predetermined $P_{LTF}$ matrices based on the $N_{LTF}$.

At step 1306, based on the $P_{LTF}$ matrix, $N_{LTF}$ and $N_{STSMAX}$, the communication apparatus performs channel estimation using the LTF of the received PPDU for the downlink or uplink single-user MIMO communications.

It is understandable that the above steps 1302, 1304 and 1306 may be performed by a same component or different components of the communication apparatus. For example, the above steps 1302, 1304 and 1306 may be performed by a controller of the communication apparatus, a receiver of the communication apparatus or any other component of the communication apparatus which is deemed suitable in practice.

Figure 14:
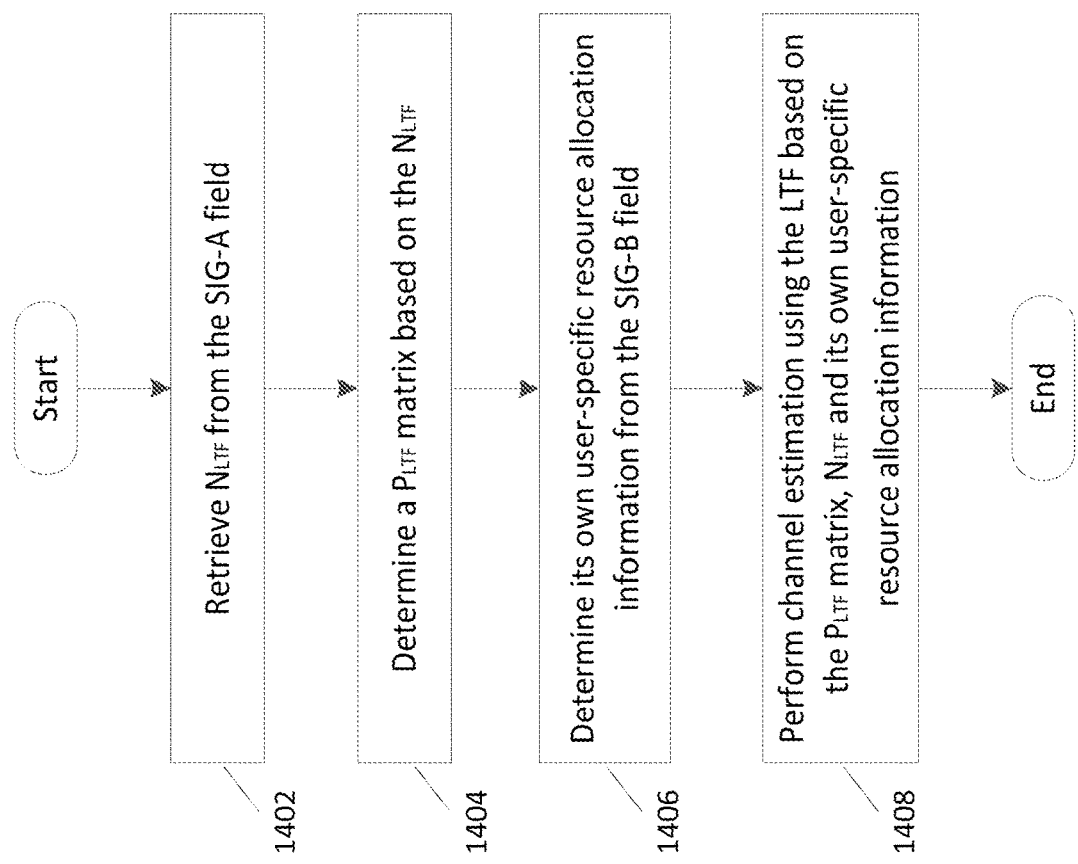
FIG. 14 shows a flow diagram of channel estimation at a STA in downlink multiuser MIMO communications, in accordance with the third embodiment.

FIG. 14 shows a flow diagram of channel estimation at a STA in downlink multiuser MIMO communications, in accordance with the third embodiment.

Steps 1402, 1404, 1406 and 1408 are the same as steps 902, 904, 906 and 908 as described with respect to FIG. 9.

Figure 15:
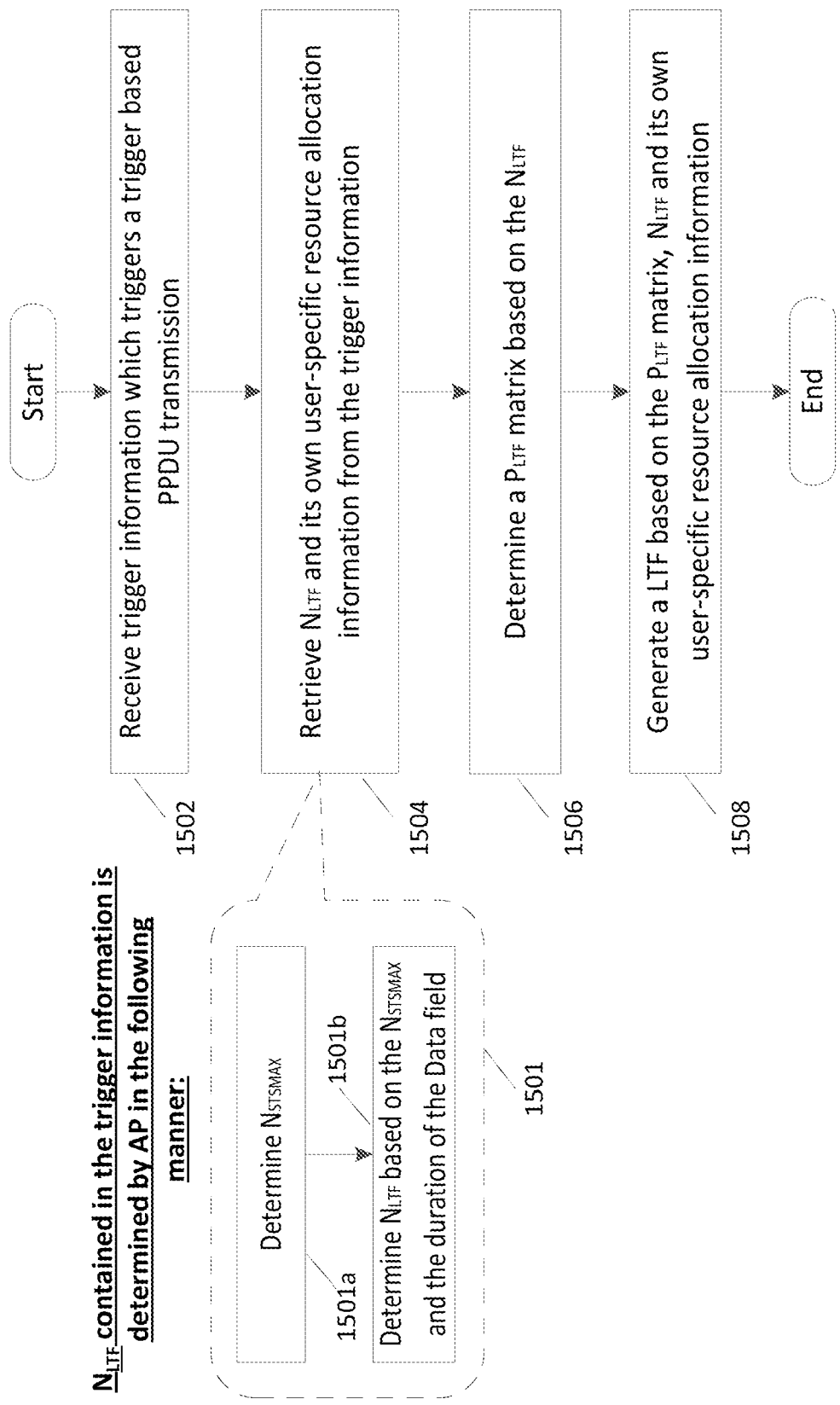
FIG. 15 shows a flow diagram of LTF generation in a PPDU at a STA in trigger based MIMO communications, in accordance with the third embodiment.

FIG. 15 shows a flow diagram of LTF generation in a PPDU at a STA in accordance with the third embodiment. This flow diagram is suitable to facilitate channel estimation in trigger based MIMO communications.

At step 1502, the STA receives trigger information from an AP. The trigger information triggers a trigger based MIMO communication.

At step 1504, the STA retrieves $N_{LTF}$ and its own user-specific resource allocation information from the trigger information.

As shown in FIG. 15, the $N_{LTF}$ in the trigger information is determined by the AP in step 1501. Step 1501 includes two sub-steps 1501a and 1501b:

a. In step 1501a, the AP determines $N_{STSMAX}$ in the PPDU.
b. In step 1501b, the AP establishes the $N_{LTF}$ by determining the $N_{LTF}$ based on the $N_{STSMAX}$ and the duration of the Data field in the PPDU.

At step 1506, the STA determines a $P_{LTF}$ matrix based on the $N_{LTF}$ for subsequent LTF generation. The $P_{LTF}$ matrix may be selected from the predetermined $P_{LTF}$ matrices based on the $N_{LTF}$.

At step 1508, the STA generates a LTF based on the $P_{LTF}$ matrix, $N_{LTF}$ and its own user-specific resource allocation information.

The generated LTF, along with other fields in the PPDU, will then be transmitted by a radio transmitter of the STA to the AP for channel estimation in trigger based MIMO communications.

It is understandable that the above steps 1502, 1504, 1506 and 1508 may be performed by a same component or different components of the STA. For example, the above steps 1502, 1504, 1506 and 1508 may be performed by a controller of the STA, a transmission signal generator of the STA or any other component of the STA which is deemed suitable in practice.

Figure 16:
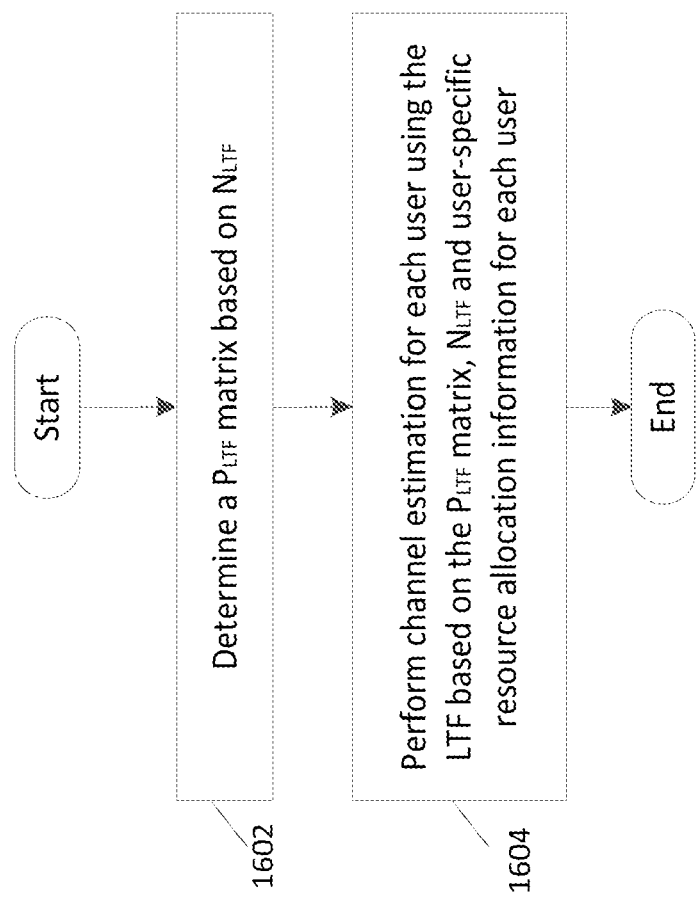
FIG. 16 shows a flow diagram of channel estimation at an AP in trigger based MIMO communications, in accordance with the third embodiment.

FIG. 16 shows a flow diagram of channel estimation at an AP in trigger based MIMO communications, in accordance with the third embodiment.

Steps 1602 and 1604 are the same as steps 1102 and 1104 as described with respect to FIG. 11.

Figure 17:
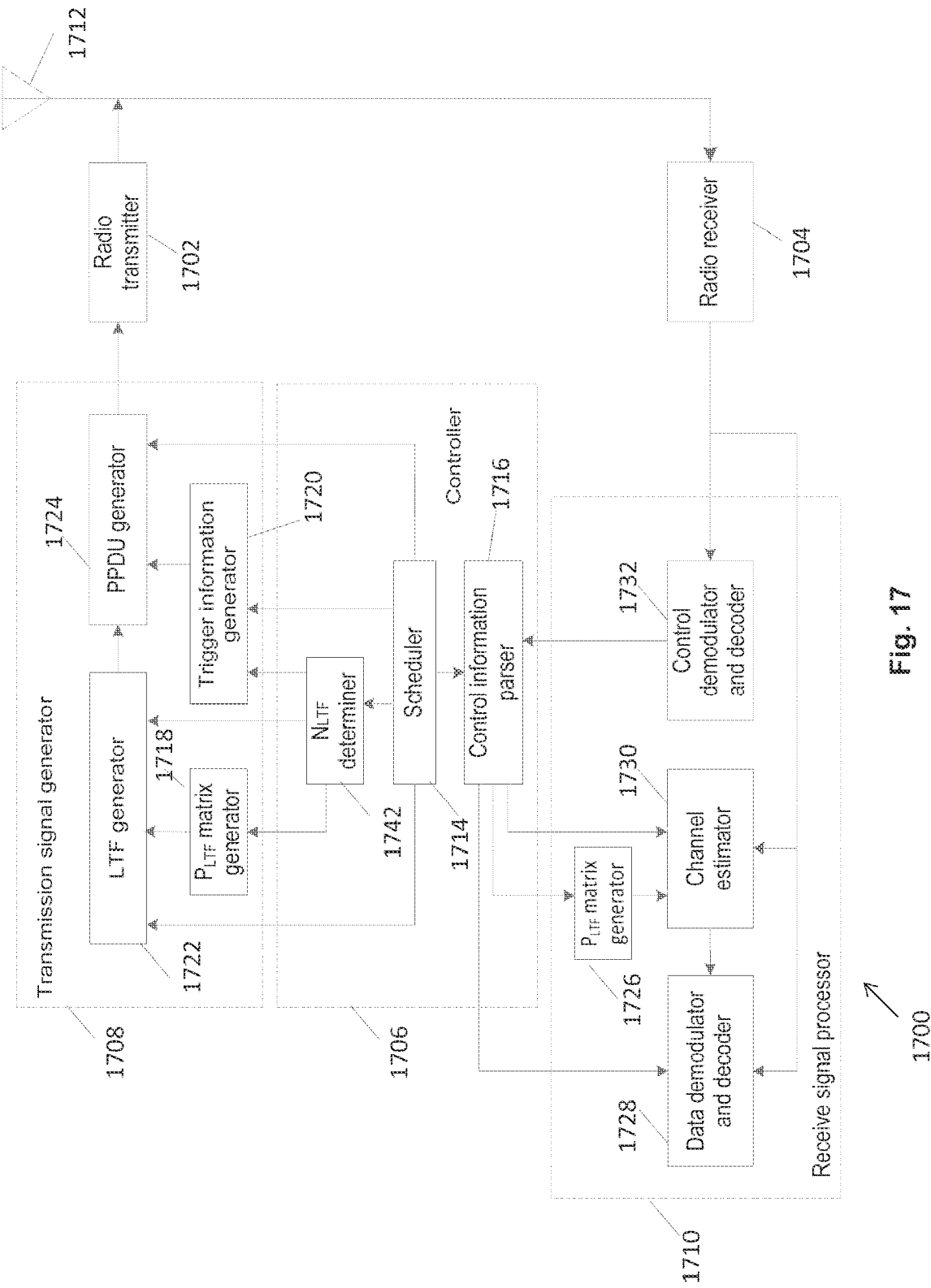
FIG. 17 shows another schematic example of a communication apparatus in single-user and multiuser MIMO communications in accordance with various embodiments as described above. The communication apparatus may serve as an AP and configured for channel estimation in accordance with various embodiments of the present disclosure.

FIG. 17 shows another schematic example of a communication apparatus in single-user and multiuser MIMO communications in accordance with various embodiments as described above. The communication apparatus may serve as an AP.

Similar to the schematic example of communication apparatus as shown in FIG. 4, the communication apparatus 1700 in the schematic example of FIG. 17 includes at least one radio transmitter 1702, at least one radio receiver 1704, multiple antennas 1712 (for the sake of simplicity, only one antenna is depicted in FIG. 17) and at least one controller 1706 for use in software and hardware aided execution of tasks it is designed to perform, including control of communications with one or more other communication apparatuses in a MIMO wireless network. The at least one controller 1706 may control at least one transmission signal generator 1708 for generating PPDUs to be sent through the radio transmitter 1702 to one or more other communication apparatuses in downlink single-user MIMO communications and downlink multiuser MIMO communications and at least one receive signal processor 1710 for processing PPDUs received through the radio receiver 1704 from the one or more other communication apparatuses in uplink single-user MIMO communications and trigger based MIMO communications. The at least one controller 1706 of the AP 1700 may also be used to control generation of PPDUs which carry trigger information for trigger based MIMO communications. The at least one transmission signal generator 1708 and the at least one receive signal processor 1710 may be stand-alone modules of the communication apparatus 1700 that communicate with the at least one controller 1706 for the above-mentioned functions, as shown in FIG. 17. Alternatively, the at least one transmission signal generator 1708 and the at least one receive signal processor 1710 may be included in the at least one controller 1706. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 1702, at least one radio receiver 1704, and at least one antenna 1712 may be controlled by the at least one controller 1706.

The at least one controller 1706 of the AP 1700 may include a $N_{LTF}$ determiner 1742, a scheduler 1714 and a control information parser 1716. The scheduler 1714 when in operation may be configured to generate user-specific resource allocation information (e.g. the number of space-time streams, starting stream index and the allocated RU) for each user/STA in downlink multiuser MIMO communications and trigger based MIMO communications or user-specific resource allocation information (e.g. the number of space-time streams) for the user in downlink single-user MIMO communications. The $N_{LTF}$ determiner 1742 when in operation may be configured to determine the $N_{LTF}$ for generating LTFs in PPDUs based on the user-specific resource allocation information in downlink MIMO communications, trigger based MIMO communications and downlink single-user MIMO communications. The control information parser 1716 may be configured to control channel estimation and data demodulation in cooperation with the receive signal processor 1710.

The at least one transmission signal generator 1708 may include a $P_{LTF}$ matrix generator 1718, a trigger information generator 1720, a LTF generator 1722 and a PPDU generator 1724. The $P_{LTF}$ matrix generator 1718 when in operation may determine a $P_{LTF}$ matrix based on the $N_{LTF}$ provided by the $N_{LTF}$ generator 1742. The LTF generator 1722 when in operation may generate LTFs based on the $P_{LTF}$ matrix generated by the $P_{LTF}$ matrix generator 1718, the $N_{LTF}$ provided by the $N_{LTF}$ generator 1742 and user-specific resource allocation information provided by the scheduler 1714. The PPDU generator 1724 when in operation may generate a PPDU with the LTF generated by the LTF generator 1722 according to the user-specific resource allocation information provided by the scheduler 1714.

The at least one receive signal processor 1710 may include a $P_{LTF}$ matrix generator 1726, a data demodulator and decoder 1728, a channel estimator 1730 and a control demodulator and decoder 1732. The control demodulator and decoder 1732 when in operation may demodulate and/or decode the SIG-A fields of the single-user PPDUs or the trigger-based PPDUs received through the radio receiver 1704. The control information parser 1716 determines $N_{STSMAX}$, $N_{LTF}$ and user-specific resource allocation information from the SIG-A fields in case of single-user PPDUs and retrieves $N_{STSMAX}$, $N_{LTF}$ and user-specific resource allocation information for each user from the scheduler 1714 in case of trigger-based PPDUs. The $P_{LTF}$ matrix generator 1726 may generate a $P_{LTF}$ matrix based on the $N_{LTF}$ provided by the control information parser 1716. The channel estimator 1730 may perform channel estimation using the LTFs of the received PPDUs based on the $N_{STSMAX}$, $N_{LTF}$ and user-specific resource allocation information provided by the control information parser 1716 and the $P_{LTF}$ matrix generated by the $P_{LTF}$ matrix generator 1726. The data demodulator and decoder 1728 when in operation may then demodulate and/or decode the Data fields of the received PPDUs based on the user-specific resource allocation information provided by the control information parser 1716 and an estimated MIMO channel provided by the channel estimator 1730.

Figure 18:
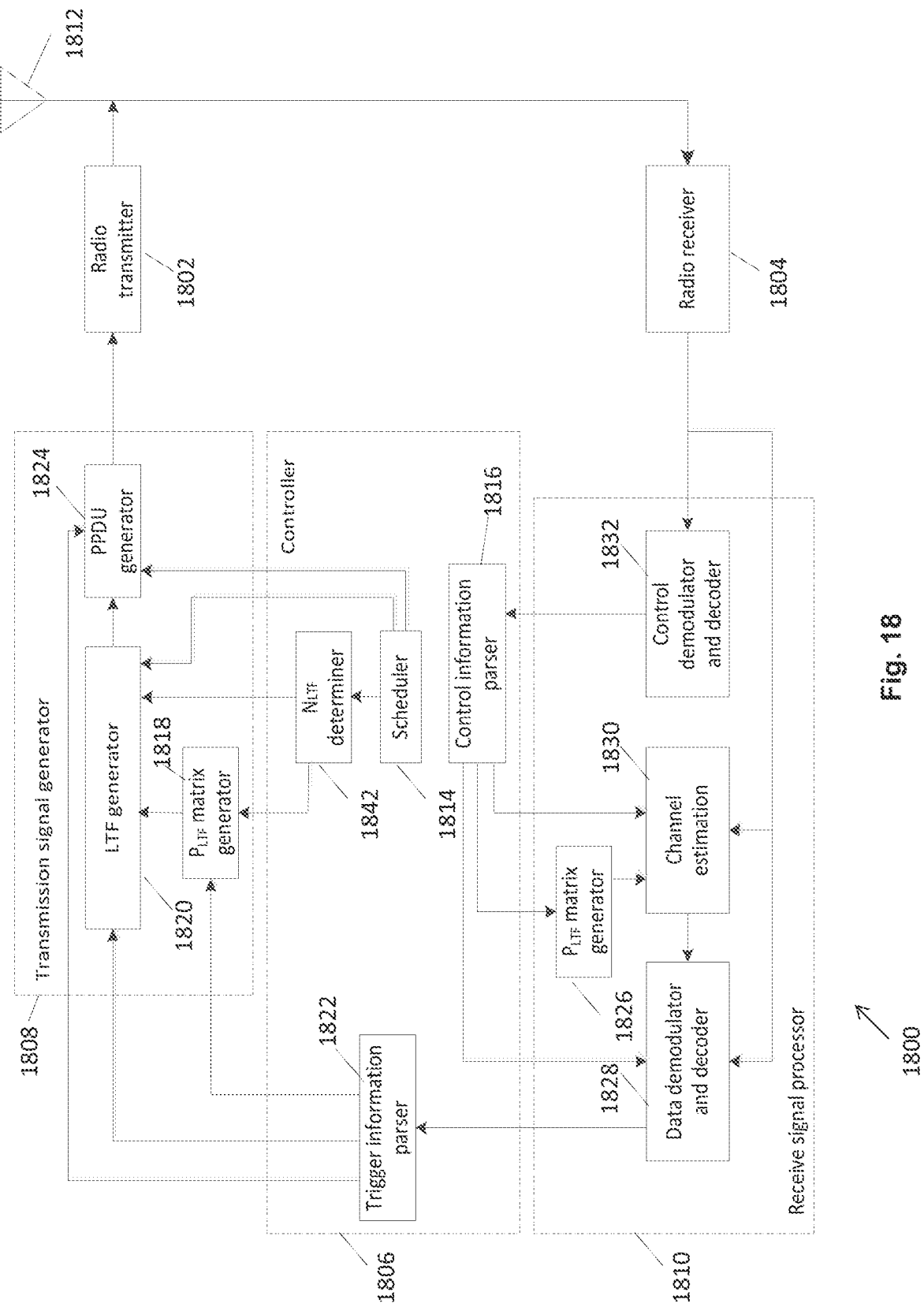
FIG. 18 shows another schematic example of a communication apparatus in single-user and multiuser MIMO communications in accordance with various embodiments as described above. The communication apparatus may serve as a STA and configured for channel estimation in accordance with various embodiments of the present disclosure.

FIG. 18 shows another schematic example of a communication apparatus in single-user and multiuser MIMO communications in accordance with various embodiments as described above. The communication apparatus may serve as a STA.

Similar to the schematic examples of communication apparatus as shown in FIGS. 4 and 17, the communication apparatus 1800 in FIG. 18 includes at least one radio transmitter 1802, at least one radio receiver 1804, multiple antennas 1812 (for the sake of simplicity, only one antenna is depicted in FIG. 18) and at least one controller 1806 for use in software and hardware aided execution of tasks it is designed to perform, including control of communications with one or more other communication apparatuses in a MIMO wireless network. The at least one controller 1806 may control at least one transmission signal generator 1808 for generating PPDUs to be sent through the radio transmitter 1802 to one or more other communication apparatuses in uplink single-user MIMO communications and trigger based MIMO communications and at least one receive signal processor 1810 for processing PPDUs received through the radio receiver 1804 from the one or more other communication apparatuses in downlink single-user MIMO communications and downlink multiuser MIMO communications. the at least one transmission signal generator 1808 and the at least one receive signal processor 1810 may be stand-alone modules of the communication apparatus 1800 that communicate with the at least one controller 1806 for the above-mentioned functions, as shown in FIG. 18. Alternatively, the at least one transmission signal generator 1808 and the at least one receive signal processor 1810 may be included in the at least one controller 1806. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 1802, at least one radio receiver 1804, and at least one antenna 1812 may be controlled by the at least one controller 1806.

The at least one controller 1806 of the STA 1800 may include a $N_{LTF}$ determiner 1812, a scheduler 1814, a control information parser 1816 and a trigger information parser 1822. The scheduler 1814 when in operation may be configured to generate user-specific resource allocation information (e.g. the number of space-time streams) for the user in uplink single-user MIMO communications. The $N_{LTF}$ determiner 1842 when in operation may be configured to determine the $N_{LTF}$ for generating LTFs in PPDUs based on the user-specific resource allocation information in uplink single-user MIMO communications. The control information parser 1816 may be configured to control channel estimation and data demodulation in cooperation with the receive signal processor 1810. The trigger information parser 1822 when in operation may be configured to retrieve $N_{LTF}$ and its own user-specific resource allocation information from the trigger information received through the receive signal processor 1810 and the radio receiver 1804 with the help of the control information parser 1816.

The at least one transmission signal generator 1808 may include a $P_{LTF}$ matrix generator 1818, a LTF generator 1820 and a PPDU generator 1824. The $P_{LTF}$ matrix generator 1818 when in operation may determine a $P_{LTF}$ matrix based on the $N_{LTF}$ provided by the $N_{LTF}$ generator 1842 in uplink single-user MIMO communications or the trigger information parser 1822 in trigger-based MIMO communications. The LTF generator 1820 when in operation may generate LTFs based on the $P_{LTF}$ matrix generated by the $P_{LTF}$ matrix generator 1818, the $N_{LTF}$ provided by the $N_{LTF}$ generator 1842 and user-specific resource allocation information provided by the scheduler 1814 in uplink single-user MIMO communications or its own user-specific resource allocation information provided by the trigger information parser 1822 in trigger-based MIMO communications. The PPDU generator 1824 when in operation may generate a PPDU with the LTF generated by the LTF generator 1820 according to the user-specific resource allocation information provided by the scheduler 1814 in single-user MIMO communications or its own user-specific resource allocation information provided by the trigger information parser 1822 in trigger-based MIMO communications.

The at least one receive signal processor 1810 may include a $P_{LTF}$ matrix generator 1826, a data demodulator and decoder 1828, a channel estimator 1830 and a control demodulator and decoder 1832. The control demodulator and decoder 1832 when in operation may demodulate and/or decode the SIG-A fields of the single-user PPDUs or both the SIG-A and SIG-B fields of the multiuser PPDUs received through the radio receiver 1804. The control information parser 1816 determines $N_{STSMAX}$, $N_{LTF}$ and its own user-specific resource allocation information from the SIG-A fields in case of single-user PPDUs and from both the SIG-A and SIG-B fields in case of multiuser PPDUs. The $P_{LTF}$ matrix generator 1826 may generate a $P_{LTF}$ matrix based on the $N_{LTF}$ provided by the control information parser 1816. The channel estimator 1830 may perform channel estimation using the LTFs of the received PPDUs based on the $N_{STSMAX}$, $N_{LTF}$ and its own user-specific resource allocation information provided by the control information parser 1816 and the $P_{LTF}$ matrix generated by the $P_{LTF}$ matrix generator 1826. The data demodulator and decoder 1828 when in operation may then demodulate and/or decode the Data fields of the received PPDUs based on the its own user-specific resource allocation information provided by the control information parser 1816 and an estimated MIMO channel provided by the channel estimator 1830.

As described above, the embodiments of the present disclosure provide an advanced communication system, communication methods and communication apparatuses that enables channel estimation in both single-user communications and multiuser communications in MIMO WLAN networks of an extremely high throughput and improves physical layer throughput in MIMO WLAN networks.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. A communication apparatus comprising:
circuitry, which, in operation, sets a number of Extremely High Throughput Long training field (EHT-LTF) symbols in a physical layer protocol data unit (PPDU) for multi user transmission based on a tentative number of EHT-LTF symbols that is common for resource units (RUs) in the PPDU and determined according to a number of spatial streams (Nss) specified for each of the RUs, wherein the number of EHT-LTF symbols is set to be equal to or larger than the tentative number of EHT-LTF symbols; and
a transmitter, which, in operation, transmits the PPDU.

2. The communication apparatus according to claim 1, wherein the tentative number of EHT-LTF symbols is predetermined in standard specification.

3. The communication apparatus according to claim 1, wherein the tentative number of EHT-LTF symbols is a maximum value that is set based on the Nss specified for each of the RUs.

4. The communication apparatus according to claim 1, wherein the circuitry, in operation, selects the number of EHT-LTF symbols from a plurality of candidates.

5. The communication apparatus according to claim 1, wherein the number of EHT-LTF symbols is set to be larger than the tentative number of EHT-LTF symbols.

6. The communication apparatus according to claim 1, wherein the PPDU comprises a field that indicates the number of EHT-LTF symbols.

7. The communication apparatus according to claim 1, wherein:
in a first case that the Nss is an even number, the tentative number of EHT-LTF symbols is equal to the Nss; and
in a second case that the Nss is an odd number other than one, the tentative number of EHT-LTF symbols is equal to 1 plus the Nss.

8. The communication apparatus according to claim 1, wherein the number of EHT-LTF symbols is set based on a format of the PPDU.

9. A communication method comprising:
setting a number of Extremely High Throughput Long training field (EHT-LTF) symbols in a physical layer protocol data unit (PPDU) for multi user transmission based on a tentative number of EHT-LTF symbols that is common for resource units (RUs) in the PPDU and determined according to a number of spatial streams (Nss) specified for each of the RUs, wherein the number of EHT-LTF symbols is set to be equal to or larger than the tentative number of EHT-LTF symbols; and
transmitting the PPDU.

10. A communication apparatus comprising:
circuitry, which, in operation, sets a number of Extremely High Throughput Long training field (EHT-LTF) symbols in trigger based physical layer protocol data units (TB PPDUs) based on a tentative number of EHT-LTF symbols that is common for resource units (RUs) in the TB PPDUs and determined according to a number of spatial streams (Nss) specified for each of the RUs, wherein the number of EHT-LTF symbols is set to be equal to or larger than the tentative number of EHT-LTF symbols;
a transmitter, which, in operation, transmits a trigger frame that solicits the TB PPDUs wherein the trigger frame indicates the number of EHT-LTF symbols; and
a receiver, which, in operation, receives the TB PPDUs.

* * * * *